(12) United States Patent
Zhang et al.

(10) Patent No.: US 10,621,991 B2
(45) Date of Patent: Apr. 14, 2020

(54) JOINT NEURAL NETWORK FOR SPEAKER RECOGNITION

(71) Applicant: Microsoft Technology Licensing, LLC, Redmond, WA (US)

(72) Inventors: Shixiong Zhang, Redmond, WA (US); Eyal Krupka, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/022,026

(22) Filed: Jun. 28, 2018

(65) Prior Publication Data

US 2019/0341058 A1  Nov. 7, 2019

Related U.S. Application Data

(60) Provisional application No. 62/667,565, filed on May 6, 2018.

(51) Int. Cl.
| | | |
|---|---|---|
| *G10L 17/18* | (2013.01) | |
| *G10L 17/06* | (2013.01) | |
| *G10L 17/02* | (2013.01) | |
| *G10L 17/04* | (2013.01) | |
| *G10L 17/22* | (2013.01) | |

(52) U.S. Cl.
CPC .............. *G10L 17/18* (2013.01); *G10L 17/02* (2013.01); *G10L 17/04* (2013.01); *G10L 17/06* (2013.01); *G10L 17/22* (2013.01)

(58) Field of Classification Search
CPC ......... G10L 17/18; G10L 17/02; G10L 17/04; G10L 17/06; G10L 17/22; G06G 10/10; G06N 3/00; G06F 3/0481

USPC ......................... 704/232, 236, 233, 275, 251
See application file for complete search history.

(56) References Cited

U.S. PATENT DOCUMENTS

| | | | |
|---|---|---|---|
| 6,567,775 B1 | 5/2003 | Maali et al. | |
| 2003/0033145 A1* | 2/2003 | Petrushin | ................ G10L 17/26 704/236 |
| 2004/0062520 A1* | 4/2004 | Gutta | ................... G11B 27/034 386/249 |

(Continued)

FOREIGN PATENT DOCUMENTS

WO   2016054304 A2   4/2016

OTHER PUBLICATIONS

Ou, et al., "Speaker identification using speech and lip features", In Proceedings of the IEEE International Joint Conference on Neural Networks, vol. 4, Jul. 31, 2005, pp. 2565-2570.

(Continued)

*Primary Examiner* — Akwasi M Sarpong
(74) *Attorney, Agent, or Firm* — Alleman Hall Creasman & Tuttle LLP

(57) ABSTRACT

A speaker recognition system includes a previously-trained joint neural network. An enrollment machine of the speaker recognition system is configured to operate the previously-trained joint neural network to enroll a new speaker based on audiovisual data featuring the newly enrolled speaker. A recognition machine of the speaker recognition system is configured to operate the previously-trained joint neural network to recognize a previously-enrolled speaker based on audiovisual data featuring the previously-enrolled speaker.

20 Claims, 16 Drawing Sheets

(56) References Cited

U.S. PATENT DOCUMENTS

| | | | |
|---|---|---|---|
| 2004/0111261 A1* | 6/2004 | Chaudhari | G10L 17/08 704/236 |
| 2005/0147291 A1* | 7/2005 | Huang | G06K 9/00288 382/159 |
| 2007/0038461 A1* | 2/2007 | Abbott | G10L 15/30 704/275 |
| 2010/0275267 A1* | 10/2010 | Walker | G07F 9/023 726/26 |
| 2010/0332229 A1* | 12/2010 | Aoyama | G06K 9/00221 704/251 |
| 2012/0290297 A1* | 11/2012 | Baughman | G10L 17/22 704/233 |
| 2014/0059010 A1* | 2/2014 | Uchida | H04N 7/155 707/661 |
| 2014/0125451 A1* | 5/2014 | Sako | H05B 37/029 340/4.2 |
| 2014/0244252 A1* | 8/2014 | Dines | G10L 15/183 704/235 |
| 2015/0100583 A1* | 4/2015 | Xi | G06F 16/285 707/738 |
| 2015/0127342 A1 | 5/2015 | Sharifi et al. | |
| 2015/0277842 A1* | 10/2015 | Huang | H04N 7/152 348/14.07 |
| 2015/0350372 A1* | 12/2015 | Griffin | H04L 67/306 348/14.07 |
| 2016/0269254 A1* | 9/2016 | Forney | H04L 43/067 |
| 2017/0134446 A1* | 5/2017 | Kitada | H04L 12/1822 |
| 2017/0270930 A1* | 9/2017 | Ozmeral | G10L 17/005 |
| 2018/0101281 A1* | 4/2018 | Nelson | G06F 3/04817 |
| 2018/0101760 A1* | 4/2018 | Nelson | H04L 65/403 |
| 2018/0144746 A1* | 5/2018 | Mishra | G10L 25/51 |

OTHER PUBLICATIONS

"International Search Report and Written Opinion Issued in PCT Application No. PCT/US19/029518", dated Jul. 12, 2019, 12 Pages.

* cited by examiner

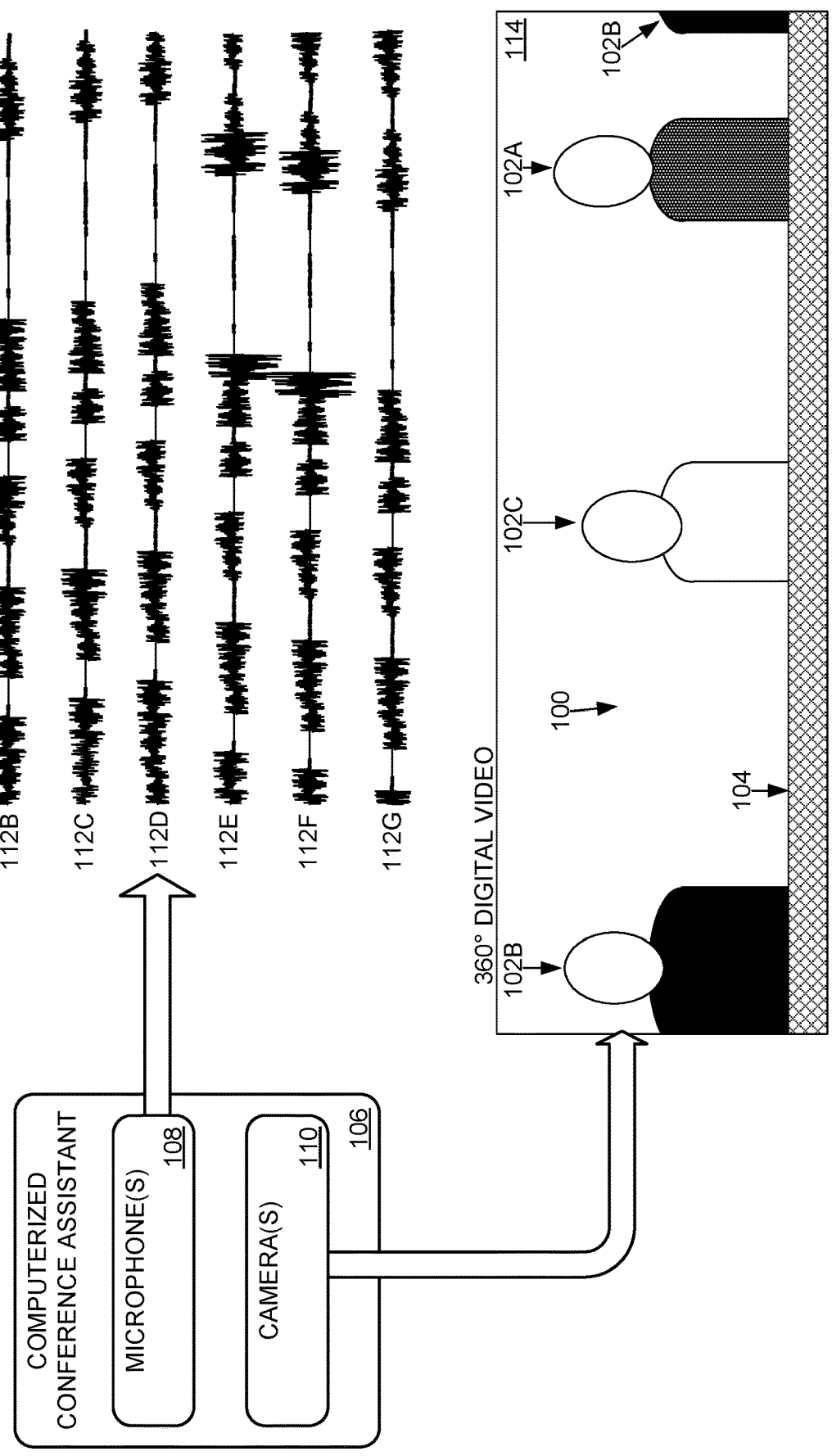

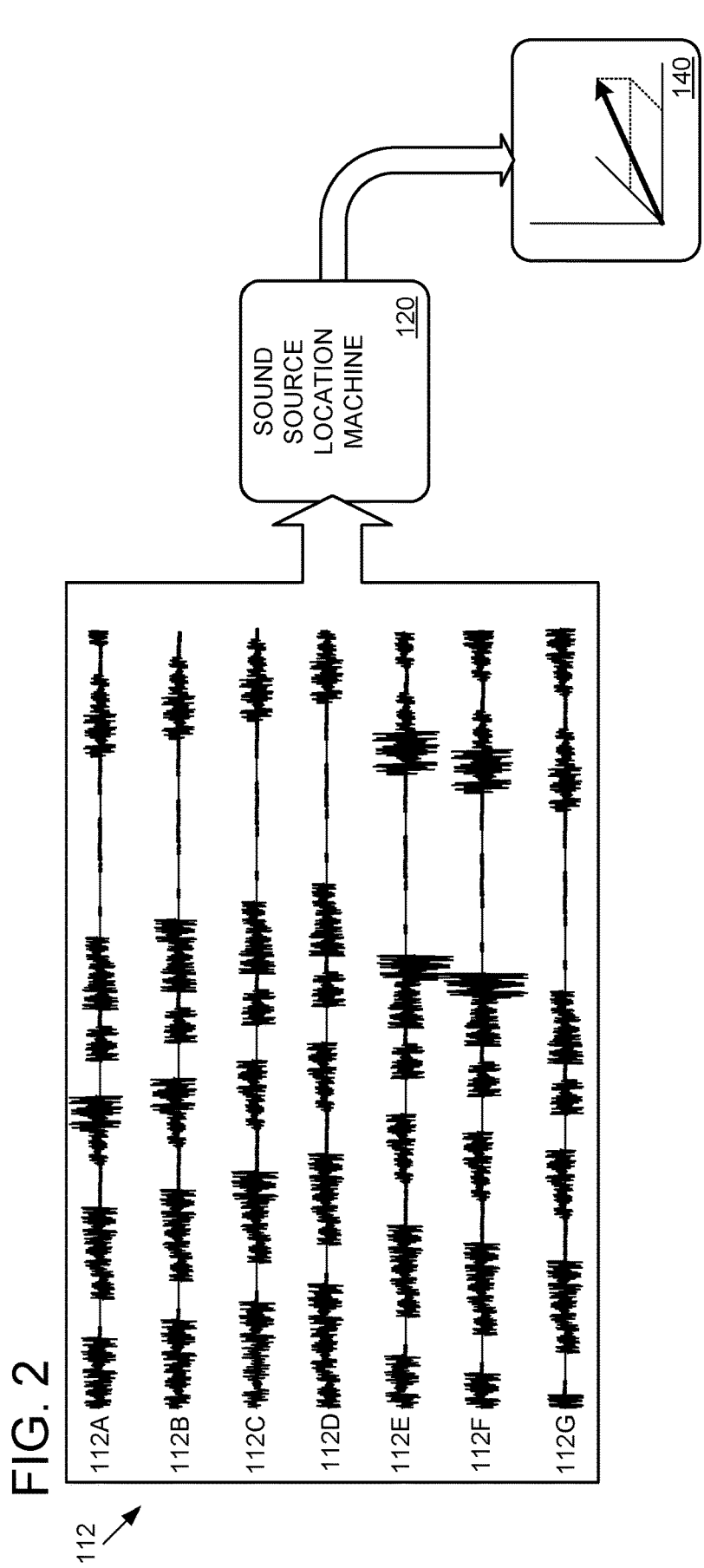

JOINT NEURAL NETWORK FOR SPEAKER RECOGNITION

CROSS REFERENCE TO RELATED APPLICATIONS

This application claims priority to U.S. Provisional Patent Application Ser. No. 62/667,565, filed May 6, 2018, the entirety of which is hereby incorporated herein by reference for all purposes.

BACKGROUND

Characteristics of a human's voice can be used to identify the human from other humans. Voice recognition systems attempt to convert human voice to audio data that is analyzed for identifying characteristics. Similarly, characteristics of a human's appearance can be used to identify the human from other humans. Face recognition systems attempt to analyze captured images for identifying characteristics.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A speaker recognition system includes a previously-trained joint neural network. An enrollment machine of the speaker recognition system is configured to operate the previously-trained joint neural network to enroll a new speaker based on audiovisual data featuring the new speaker. A recognition machine of the speaker recognition system is configured to operate the previously-trained joint neural network to recognize a previously-enrolled speaker based on audiovisual data featuring the previously-enrolled speaker.

BRIEF DESCRIPTION OF THE DRAWINGS

FIG. 1A-1C depict a computing environment including an exemplary computerized conference assistant.

FIG. 2 schematically shows analysis of sound signals by a sound source localization machine.

DETAILED DESCRIPTION

FIG. 1 shows an example conference environment 100 including three conference participants 102A, 102B, and 102C meeting around a table 104. A computerized conference assistant 106 is on table 104 ready to facilitate a meeting between the conference participants. Computerized conference assistants consistent with this disclosure may be configured with a myriad of features designed to facilitate productive meetings. However, the following description primarily focuses on features pertaining to associating recorded speech with the appropriate speaker. While the following description uses computerized conference assistant 106 as an example computer configured to attribute speech to the correct speaker, other computers or combinations of computers utilizing any number of different microphone and/or camera configurations may be configured to utilize the techniques described below. As such, the present disclosure is in no way limited to computerized conference assistant 106.

Figure 1B:
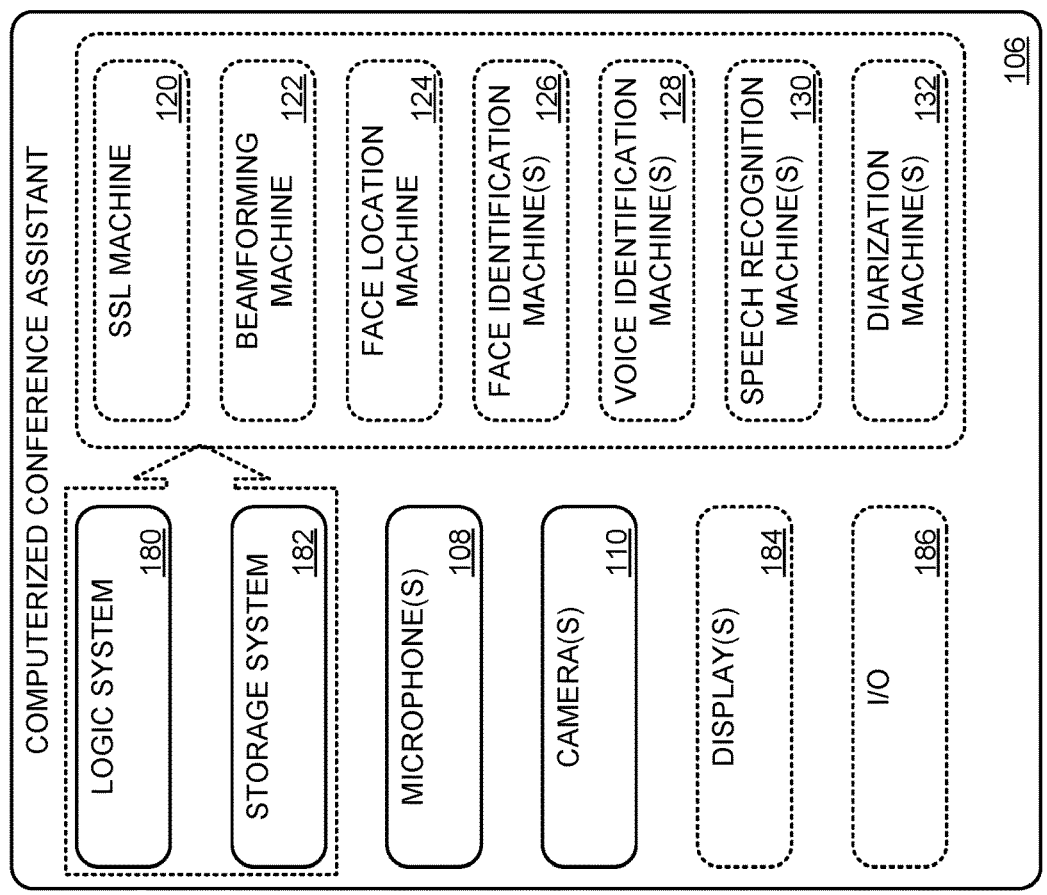

FIG. 1B schematically shows relevant aspects of computerized conference assistant 106, each of which is discussed below. Of particular relevance, computerized conference assistant 106 includes microphone(s) 108 and camera(s) 110.

Figure 1A:
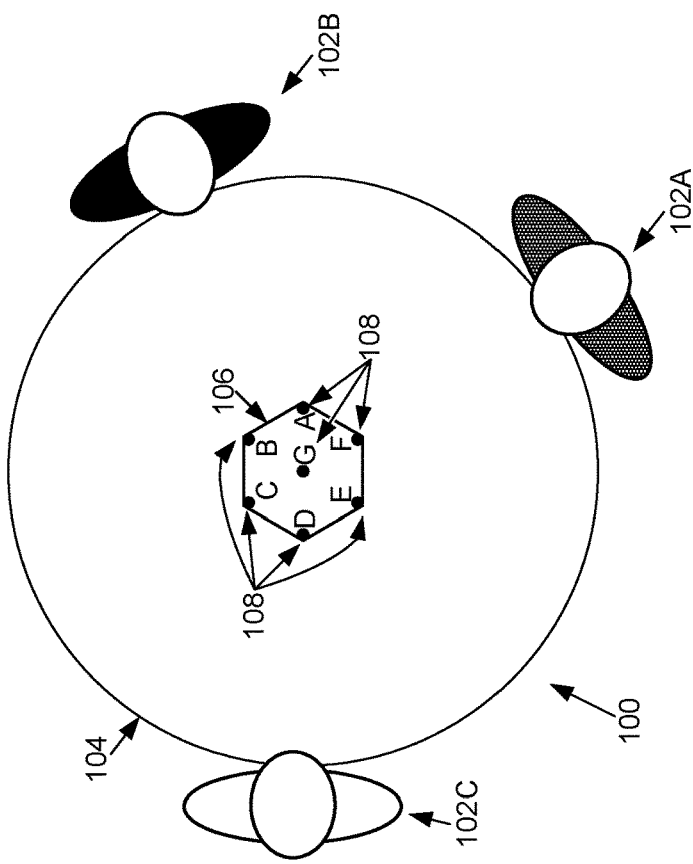

As shown in FIG. 1A, the computerized conference assistant 106 includes an array of seven microphones 108A, 108B, 108C, 108D, 108E, 108F, and 108G. As shown in FIG. 1C, these microphones 108 are configured to directionally record sound and convert the audible sound into a computer-readable audio signal 112 (i.e., signals 112a, 112b, 112c, 112d, 112e, 112f, and 112g respectively). An analog to digital converter and optional digital encoders may be used to convert the sound into the computer-readable audio signals. Microphones 108A-F are equally spaced around the computerized conference assistant 106 and aimed to directionally record sound originating in front of the microphone. Microphone 108g is positioned between the other microphones and aimed upward.

In some implementations, computerized conference assistant 106 includes a 360° camera configured to convert light of one or more electromagnetic bands (e.g., visible, infrared, and/or near infrared) into a 360° digital video 114 or other suitable visible, infrared, near infrared, spectral, and/or depth digital video. In some implementations, the 360° camera may include fisheye optics that redirect light from all azimuthal angles around the computerized conference assistant 106 to a single matrix of light sensors, and logic for mapping the independent measurements from the sensors to a corresponding matrix of pixels in the 360° digital video 114. In some implementations, two or more cooperating cameras may take overlapping sub-images that are stitched together into digital video 114. In some implementations, camera(s) 110 have a collective field of view of less than 360° and/or two or more originating perspectives (e.g., cameras pointing toward a center of the room from the four corners of the room). 360° digital video 114 is shown as being substantially rectangular without appreciable geometric distortion, although this is in no way required.

Returning briefly to FIG. 1B, computerized conference assistant 106 includes a sound source localization (SSL) machine 120 that is configured to estimate the location(s) of sound(s) based on signals 112. FIG. 2 schematically shows SSL machine 120 analyzing signals 112*a-g* to output an estimated origination 140 of the sound modeled by signals 112*a-g*. As introduced above, signals 112*a-g* are respectively generated by microphones 108*a-g*. Each microphone has a different physical position and/or is aimed in a different direction. Microphones that are farther from a sound source and/or aimed away from a sound source will generate a relatively lower amplitude and/or slightly phase delayed signal 112 relative to microphones that are closer to and/or aimed toward the sound source. As an example, while microphones 108*a* and 108*d* may respectively produce signals 112*a* and 112*d* in response to the same sound, signal 112*a* may have a measurably greater amplitude if the recorded sound originated in front of microphone 108*a*. Similarly, signal 112*d* may be phase shifted behind signal 112*a* due to the longer time of flight (ToF) of the sound to microphone 108*d*. SSL machine 120 may use the amplitude, phase difference, and/or other parameters of the signals 112*a-g* to estimate the origination 140 of a sound. SSL machine 120 may be configured to implement any suitable two- or three-dimensional location algorithms, including but not limited to previously-trained artificial neural networks, maximum likelihood algorithms, multiple signal classification algorithms, and cross-power spectrum phase analysis algorithms. Depending on the algorithm(s) used in a particular application, the SSL machine 120 may output an angle, vector, coordinate, and/or other parameter estimating the origination 140 of a sound.

Figure 3:
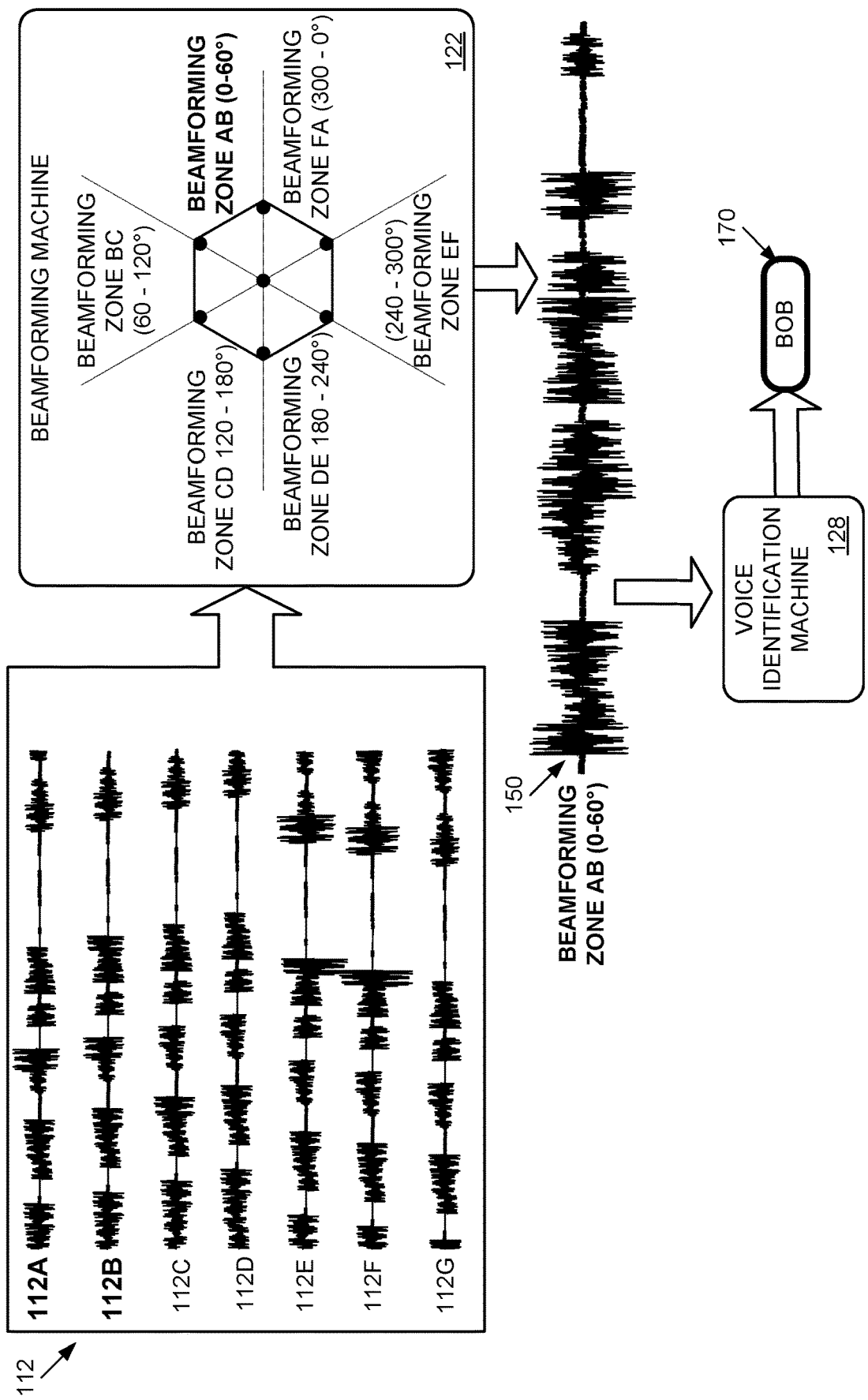
FIG. 3 schematically shows beamforming of sound signals by a beamforming machine.

As shown in FIG. 1B, computerized conference assistant 106 also includes a beamforming machine 122. The beamforming machine 122 may be configured to isolate sounds originating in a particular zone (e.g., a 0-60° arc) from sounds originating in other zones. In the embodiment depicted in FIG. 3, beamforming machine 122 is configured to isolate sounds in any of six equally-sized static zones. In other implementations, there may be more or fewer static zones, dynamically sized zones (e.g., a focused 15° arc), and/or dynamically aimed zones (e.g., a 60° zone centered at 9°). Any suitable beamforming signal processing may be utilized to subtract sounds originating outside of a selected zone from a resulting beamformed signal 150. In implementations that utilize dynamic beamforming, the location of the various speakers may be used as criteria for selecting the number, size, and centering of the various beamforming zones. As one example, the number of zones may be selected to equal the number of speakers, and each zone may be centered on the location of the speaker (e.g., as determined via face identification and/or sound source localization). In some implementations beamforming machine may be configured to independently and simultaneously listen to two or more different zones, and output two or more different beamformed signals in parallel. As such, two or more overlapping/interrupting speakers may be independently processed.

Figure 4:
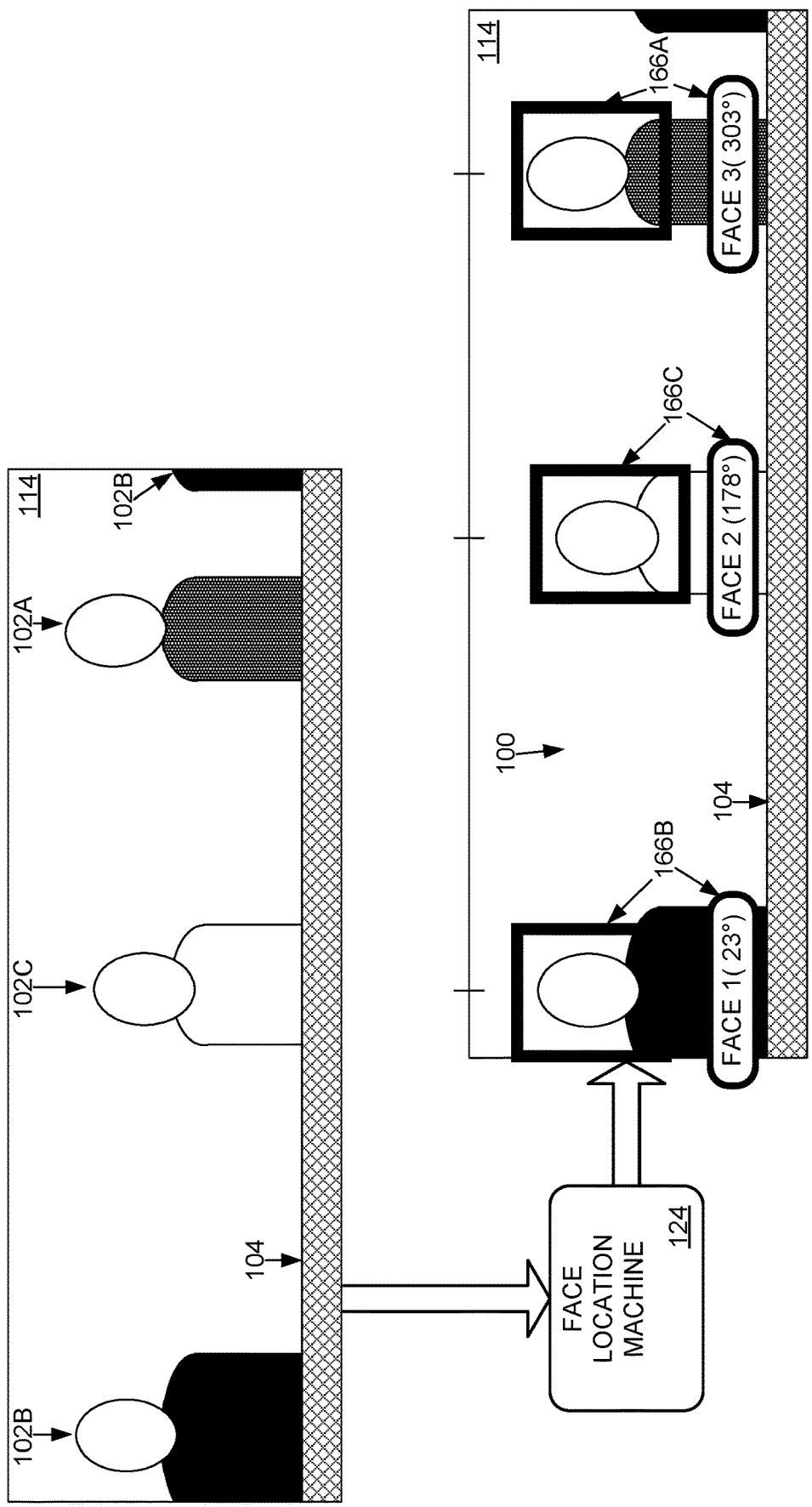
FIG. 4 schematically shows detection of human faces by a face detection machine.

As shown in FIG. 1B, computerized conference assistant 106 includes a face location machine 124 and a face identification machine 126. As shown in FIG. 4, face location machine 124 is configured to find candidate faces 166 in digital video 114. As an example, FIG. 4 shows face location machine 124 finding candidate FACE(1) at 23°, candidate FACE(2) at 178°, and candidate FACE(3) at 303°. The candidate faces 166 output by the face location machine 124 may include coordinates of a bounding box around a located face image, a portion of the digital image where the face was located, other location information (e.g., 23°), and/or labels (e.g., "FACE(1)").

Figure 5:
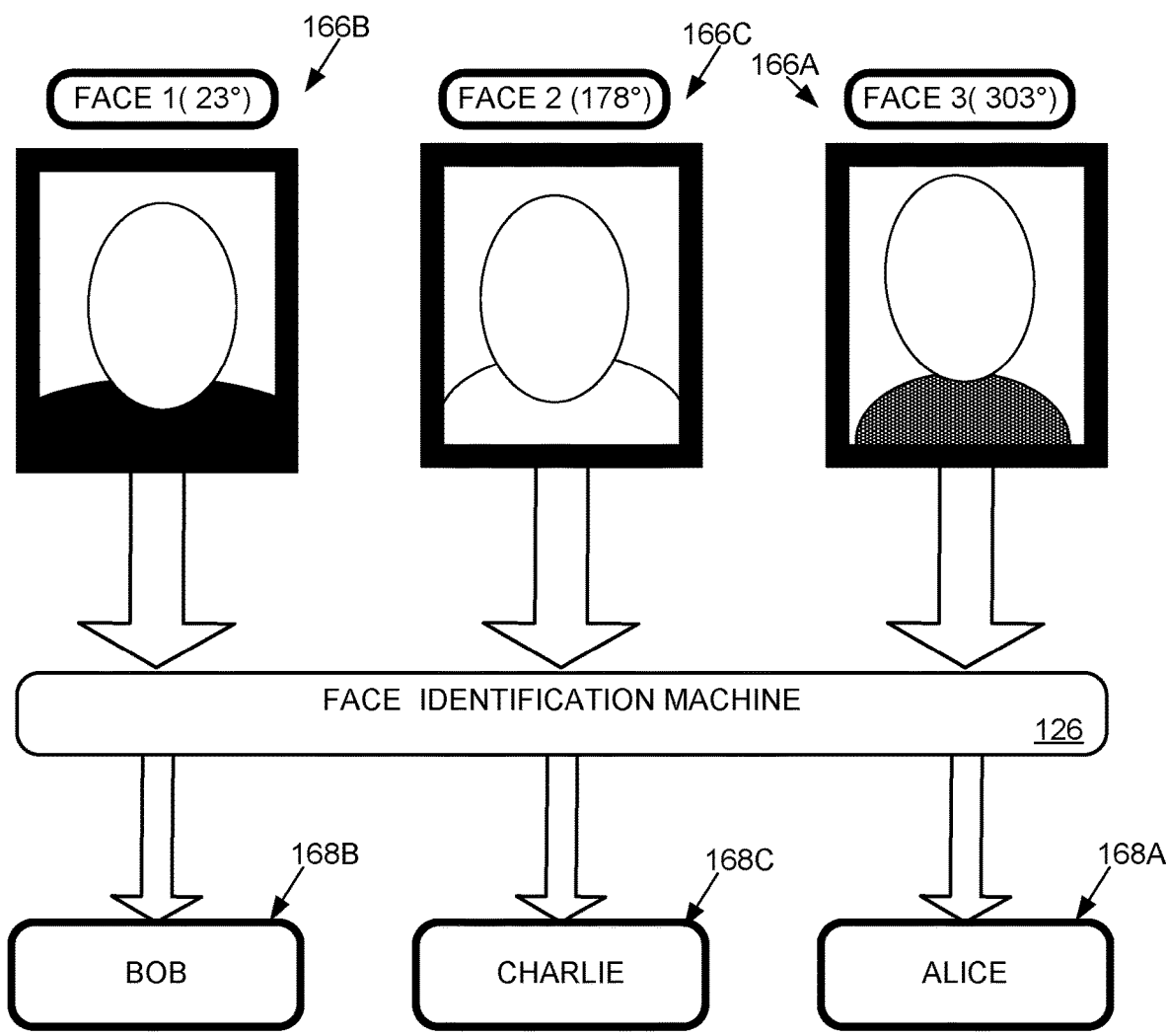
FIG. 5 schematically shows identification of human faces by a face identification machine.

Face identification machine 126 optionally may be configured to determine an identity 168 of each candidate face 166 by analyzing just the portions of the digital video 114 where candidate faces 166 have been found. In other implementations, the face location step may be omitted, and the face identification machine may analyze a larger portion of the digital video 114 to identify faces. FIG. 5 shows an example in which face identification machine 126 identifies candidate FACE(1) as "Bob," candidate FACE(2) as "Charlie," and candidate FACE(3) as "Alice." While not shown, each identity 168 may have an associated confidence value, and two or more different identities 168 having different confidence values may be found for the same face (e.g., Bob(88%), Bert (33%)). If an identity with at least a threshold confidence cannot be found, the face may remain unidentified and/or may be given a generic unique identity 168 (e.g., "Guest(42)"). Speech may be attributed to such generic unique identities.

When used, face location machine 124 may employ any suitable combination of state-of-the-art and/or future machine learning (ML) and/or artificial intelligence (AI) techniques. Non-limiting examples of techniques that may be incorporated in an implementation of face location machine 124 include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by face location machine 124 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the face location machine 124.

Non-limiting examples of training procedures for face location machine 124 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of face location machine 124 may be trained simultaneously with regard to an objective function measuring performance of collective functioning of the plurality of components (e.g., with regard to reinforcement feedback and/or with regard to labelled training data), in order to improve such collective functioning. In some examples, one or more components of face location machine 124 may be trained independently of other components (e.g., offline training on historical data). For example, face location machine 124 may be trained via supervised training on labelled training data comprising images with labels indicating any face(s) present within such images, and with regard to an objective function measuring an accuracy, precision, and/or recall of locating faces by face location machine 124 as compared to actual locations of faces indicated in the labelled training data.

In some examples, face location machine 124 may employ a convolutional neural network configured to convolve inputs with one or more predefined, randomized and/or learned convolutional kernels. By convolving the convolutional kernels with an input vector (e.g., representing digital video 114), the convolutional neural network may detect a feature associated with the convolutional kernel. For example, a convolutional kernel may be convolved with an input image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers. Convolutional kernels of further convolutional layers may recognize higher-level visual features, e.g., shapes and patterns, and more generally spatial arrangements of lower-level visual features. Some layers of the convolutional neural network may accordingly recognize and/or locate visual features of faces (e.g., noses, eyes, lips). Accordingly, the convolutional neural network may recognize and locate faces in the input image. Although the foregoing example is described with regard to a convolutional neural network, other neural network techniques may be able to detect and/or locate faces and other salient features based on detecting low-level visual features, higher-level visual features, and spatial arrangements of visual features.

Face identification machine 126 may employ any suitable combination of state-of-the-art and/or future ML and/or AI techniques. Non-limiting examples of techniques that may be incorporated in an implementation of face identification machine 126 include support vector machines, multi-layer neural networks, convolutional neural networks, recurrent neural networks, associative memories, unsupervised spatial and/or clustering methods, and/or graphical models.

In some examples, face identification machine 126 may be implemented using one or more differentiable functions and at least partially determined by a set of trainable parameters. Accordingly, the trainable parameters may be adjusted through any suitable training procedure, in order to continually improve functioning of the face identification machine 126.

Non-limiting examples of training procedures for face identification machine 126 include supervised training, zero-shot, few-shot, unsupervised learning methods, reinforcement learning and/or generative adversarial neural network training methods. In some examples, a plurality of components of face identification machine 126 may be trained simultaneously with regard to an objective function measuring performance of collective functioning of the plurality of components in order to improve such collective function-ing. In some examples, one or more components of face identification machine 126 may be trained independently of other components.

In some examples, face identification machine 126 may employ a convolutional neural network configured to detect and/or locate salient features of input images. In some examples, face identification machine 126 may be trained via supervised training on labelled training data comprising images with labels indicating a specific identity of any face(s) present within such images, and with regard to an objective function measuring an accuracy, precision, and/or recall of identifying faces by face identification machine 126 as compared to actual identities of faces indicated in the labelled training data. In some examples, face identification machine 126 may be trained via supervised training on labelled training data comprising pairs of face images with labels indicating whether the two face images in a pair are images of a single individual or images of two different individuals, and with regard to an objective function measuring an accuracy, precision, and/or recall of distinguishing single-individual pairs from two-different-individual pairs.

In some examples, face identification machine 126 may be configured to classify faces by selecting and/or outputting a confidence value for an identity from a predefined selection of identities, e.g., a predefined selection of identities for whom face images were available in training data used to train face identification machine 126. In some examples, face identification machine 126 may be configured to assess a feature vector representing a face, e.g., based on an output of a hidden layer of a neural network employed in face identification machine 126. Feature vectors assessed by face identification machine 126 for a face image may represent an embedding of the face image in a representation space learned by face identification machine 126. Accordingly, feature vectors may represent salient features of faces based on such embedding in the representation space.

In some examples, face identification machine 126 may be configured to enroll one or more individuals for later identification. Enrollment by face identification machine 126 may include assessing a feature vector representing the individual's face, e.g., based on an image and/or video of the individual's face. In some examples, identification of an individual based on a test image may be based on a comparison of a test feature vector assessed by face identification machine 126 for the test image, to a previously-assessed feature vector from when the individual was enrolled for later identification. Comparing a test feature vector to a feature vector from enrollment may be performed in any suitable fashion, e.g., using a measure of similarity such as cosine or inner product similarity, and/or by unsupervised spatial and/or clustering methods (e.g., approximative k-nearest neighbor methods). Comparing the test feature vector to the feature vector from enrollment may be suitable for assessing identity of individuals represented by the two vectors, e.g., based on comparing salient features of faces represented by the vectors.

As shown in FIG. 1B, computerized conference assistant 106 includes a voice identification machine 128. The voice identification machine 128 is analogous to the face identification machine 126 because it also attempts to identify an individual. However, unlike the face identification machine 126, which is trained on and operates on video images, the voice identification machine is trained on and operates on audio signals, such as beamformed signal 150 and/or signal(s) 112. The ML and AI techniques described above may be used by voice identification machine 128. The voice identification machine outputs voice IDs 170, optionally with corresponding confidences (e.g., Bob(77%)).

Figure 6:
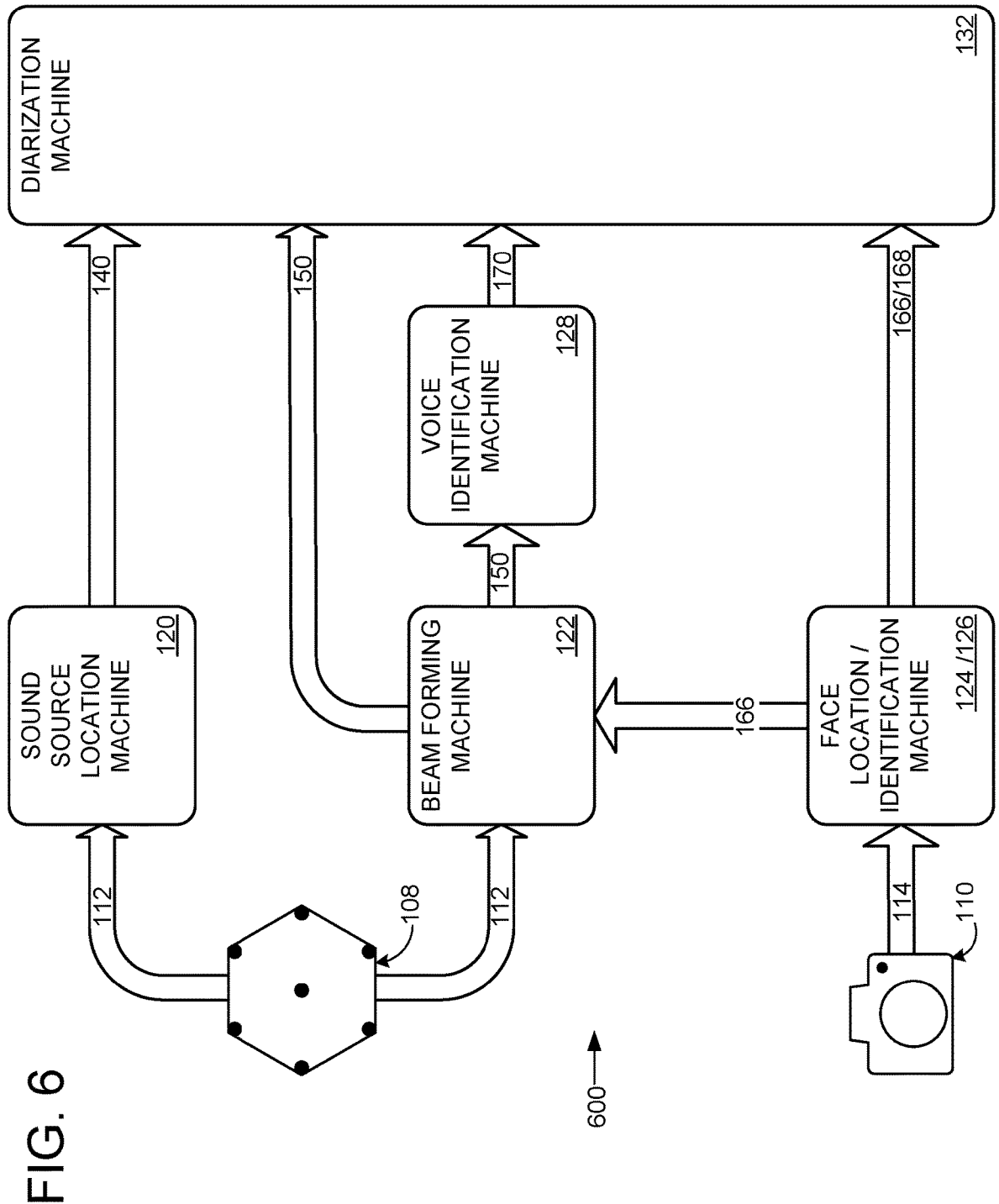
FIG. 6 schematically shows an exemplary diarization framework.

FIG. 6 schematically shows an example diarization framework 600 for the above-discussed components of computerized conference assistant 106. While diarization framework 600 is described below with reference to computerized conference assistant 106, the diarization framework may be implemented using different hardware, firmware, and/or software components (e.g., different microphone and/or camera placements and/or configurations). Furthermore, SSL machine 120, beamforming machine 122, face location machine 124, and/or face identification machine 128 may be used in different sensor fusion frameworks designed to associate speech utterances with the correct speaker.

In the illustrated implementation, microphones 108 provide signals 112 to SSL machine 120 and beamforming machine 122, and the SLL machine outputs origination 140 to diarization machine 132. In some implementations, origination 140 optionally may be output to beamforming machine 122. Camera 110 provides 360° digital videos 114 to face location machine 124 and face identification machine 126. The face location machine passes the locations of candidate faces 166 (e.g., 23°) to the beamforming machine 122, which the beamforming machine may utilize to select a desired zone where a speaker has been identified. The beamforming machine 122 passes beamformed signal 150 to diarization machine 132 and to voice identification machine 128, which passes voice ID 170 to the diarization machine 132. Face identification machine 128 outputs identities 168 (e.g., "Bob") with corresponding locations of candidate faces (e.g., 23°) to the diarization machine. While not shown, the diarization machine may receive other information and use such information to attribute speech utterances with the correct speaker.

Diarization machine 132 is a sensor fusion machine configured to use the various received signals to associate recorded speech with the appropriate speaker. The diarization machine is configured to attribute information encoded in the beamformed signal or another audio signal to the human responsible for generating the corresponding sounds/speech. In some implementations (e.g., FIG. 11), the diarization machine is configured to attribute the actual audio signal to the corresponding speaker (e.g., label the audio signal with the speaker identity). In some implementations (e.g., FIG. 12), the diarization machine is configured to attribute speech-recognized text to the corresponding speaker (e.g., label the text with the speaker identity).

In one nonlimiting example, the following algorithm may be employed:

Video input (e.g., 360° digital video 114) from start to time t is denoted as $V_{1:t}$ Audio input from N microphones (e.g., signals 112) is denoted as $A_{1:t}^{[1:N]}$ Diarization machine 132 solves WHO is speaking, at WHERE and WHEN, by maximizing the following:

$$\max_{who, angle} P(who, angle | A_{1:t}^{[1:N]}, V_{1:t})$$

Where $P(who, angle | A_{1:t}^{[1:N]}, V_{1:t})$ is computed by $P(who | A_{1:t}^{[1:N]}, angle) \times P(angle | A_{1:t}^{[1:N]}) \times P(who, angle | V_{1:t})$ Where $P(who | A_{1:t}^{[1:N]}, angle)$ is the Voice ID 170, which takes N channel inputs and selects one beamformed signal 150 according to the angle of candidate face 166;

$P(angle | A_{1:t}^{[1:N]})$ is the origination 140, which takes N channel inputs and predicts which angle most likely has sound;

$P(who, angle | V_{1:t})$ is the identity 168, which takes the video 114 as input and predicts the probability of each face showing up at each angle.

The above framework may be adapted to use any suitable processing strategies, including but not limited to the ML/AI techniques discussed above. Using the above framework, the probability of one face at the found angle is usually dominative, e.g., probability of Bob's face at 23° is 99%, and the probabilities of his face at all the other angles is almost 0%.

Figure 7:
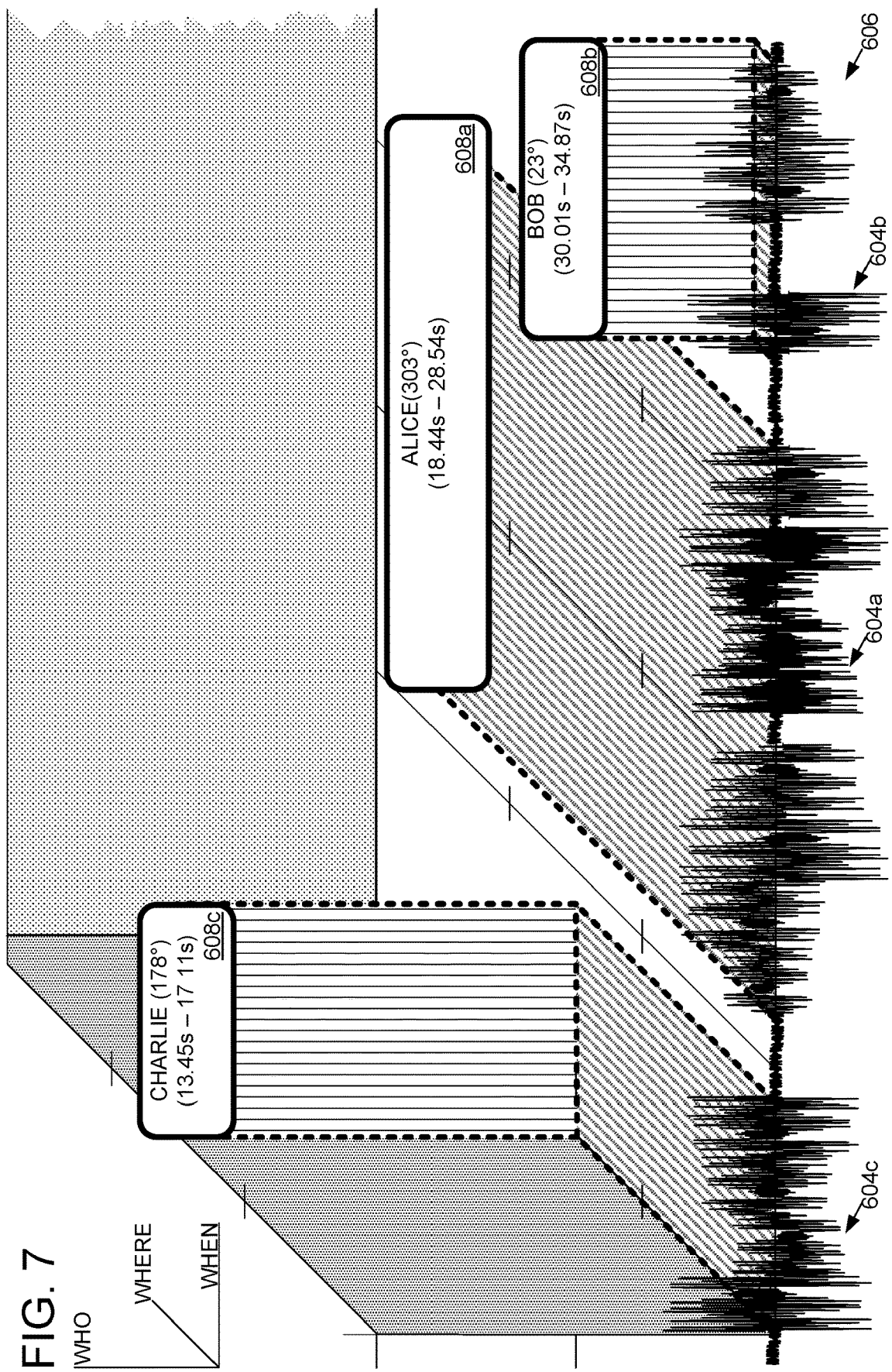
FIG. 7 is a visual representation of an example output of a diarization machine.

FIG. 7 is a visual representation of an example output of diarization machine 132. In FIG. 6, a vertical axis is used to denote WHO (e.g., Bob) is speaking; the horizontal axis denotes WHEN (e.g., 30.01 s-34.87 s) that speaker is speaking; and the depth axis denotes from WHERE (e.g., 23°) that speaker is speaking. Diarization machine 132 may use this WHO/WHEN/WHERE information to label corresponding segments 604 of the audio signal(s) 606 under analysis with labels 608. The segments 604 and/or corresponding labels may be output from the diarization machine 132 in any suitable format. The output effectively associates speech with a particular speaker during a conversation among N speakers, and allows the audio signal corresponding to each speech utterance (with WHO/WHEN/WHERE labeling/metadata) to be used for myriad downstream operations. One nonlimiting downstream operation is conversation transcription, as discussed in more detail below. As another example, accurately attributing speech utterances with the correct speaker can be used by an AI assistant to identify who is talking, thus decreasing a necessity for speakers to address an AI assistant with a keyword (e.g., "Cortana").

Figure 8:
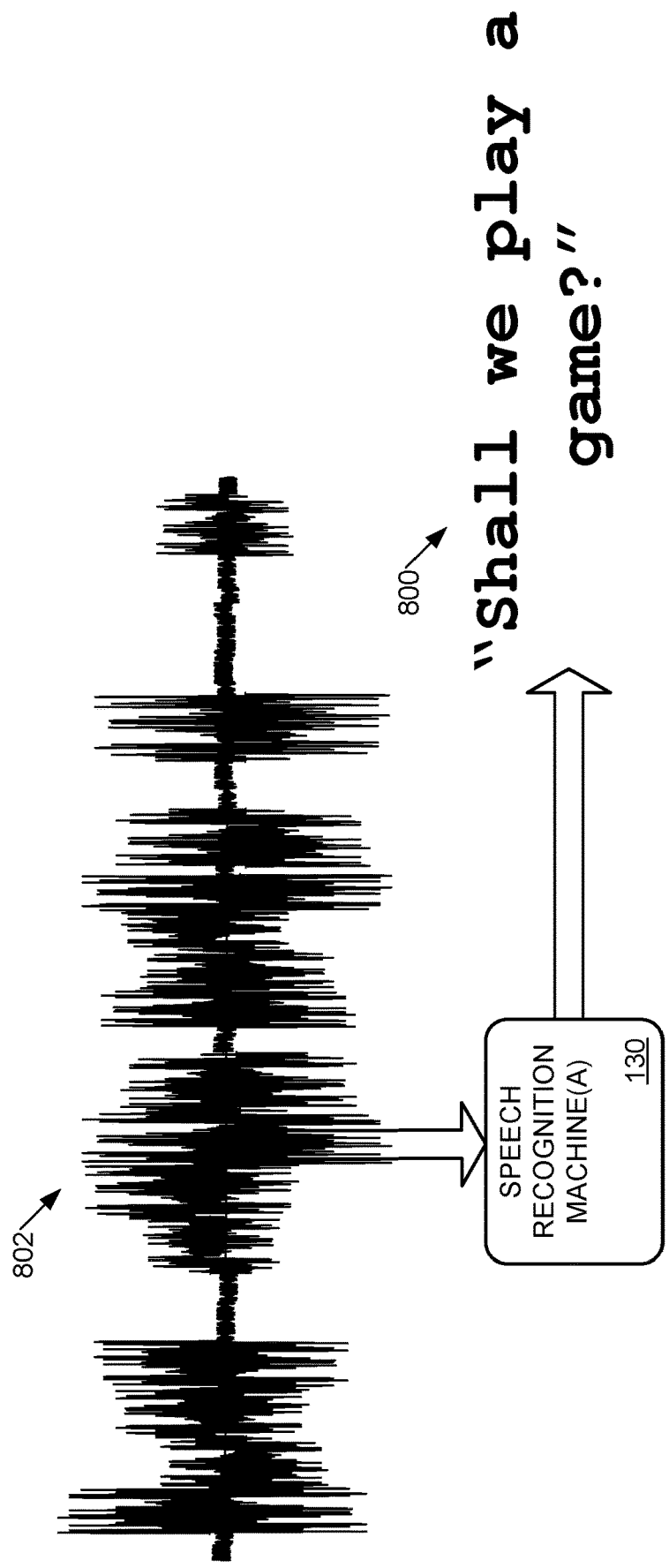
FIG. 8 schematically shows recognition of an utterance by a speech recognition machine.

Returning briefly to FIG. 1B, computerized conference assistant 106 may include a speech recognition machine 130. As shown in FIG. 8, the speech recognition machine 130 may be configured to translate an audio signal of recorded speech (e.g., signals 112, beamformed signal 150, signal 606, and/or segments 604) into text 800. In the scenario illustrated in FIG. 8, speech recognition machine 130 translates signal 802 into the text: "Shall we play a game?"

Speech recognition machine 130 may employ any suitable combination of state-of-the-art and/or future natural language processing (NLP), AI, and/or ML techniques. Non-limiting examples of techniques that may be incorporated in an implementation of speech recognition machine 130 include support vector machines, multi-layer neural networks, convolutional neural networks (e.g., including temporal convolutional neural networks for processing natural language sentences), word embedding models (e.g., GloVe or Word2Vec), recurrent neural networks, associative memories, unsupervised spatial and/or clustering methods, graphical models, and/or natural language processing techniques (e.g., tokenization, stemming, constituency and/or dependency parsing, and/or intent recognition).

In some examples, speech recognition machine 130 may be implemented using one or more differentiable functions and at least partially determined by a set of trainable parameters. Accordingly, the trainable parameters may be adjusted through any suitable training procedure, in order to continually improve functioning of the speech recognition machine 130.

Non-limiting examples of training procedures for speech recognition machine 130 include supervised training, zero-shot, few-shot, unsupervised learning methods, reinforcement learning and/or generative adversarial neural network training methods. In some examples, a plurality of components of speech recognition machine 130 may be trained simultaneously with regard to an objective function measuring performance of collective functioning of the plurality of components in order to improve such collective functioning. In some examples, one or more components of speech recognition machine 130 may be trained independently of other components. In an example, speech recognition machine 130 may be trained via supervised training on labelled training data comprising speech audio annotated to indicate actual lexical data (e.g., words, phrases, and/or any other language data in textual form) corresponding to the speech audio, with regard to an objective function measuring an accuracy, precision, and/or recall of correctly recognizing lexical data corresponding to speech audio.

In some examples, speech recognition machine 130 may use an AI and/or ML model (e.g., an LSTM and/or a temporal convolutional neural network) to represent speech audio in a computer-readable format. In some examples, speech recognition machine 130 may represent speech audio input as word embedding vectors in a learned representation space shared by a speech audio model and a word embedding model (e.g., a latent representation space for GloVe vectors, and/or a latent representation space for Word2Vec vectors). Accordingly, by representing speech audio inputs and words in the learned representation space, speech recognition machine 130 may compare vectors representing speech audio to vectors representing words, to assess, for a speech audio input, a closest word embedding vector (e.g., based on cosine similarity and/or approximative k-nearest neighbor methods or any other suitable comparison method).

In some examples, speech recognition machine 130 may be configured to segment speech audio into words (e.g., using LSTM trained to recognize word boundaries, and/or separating words based on silences or amplitude differences between adjacent words). In some examples, speech recognition machine 130 may classify individual words to assess lexical data for each individual word (e.g., character sequences, word sequences, n-grams). In some examples, speech recognition machine 130 may employ dependency and/or constituency parsing to derive a parse tree for lexical data. In some examples, speech recognition machine 130 may operate AI and/or ML models (e.g., LSTM) to translate speech audio and/or vectors representing speech audio in the learned representation space, into lexical data, wherein translating a word in the sequence is based on the speech audio at a current time and further based on an internal state of the AI and/or ML models representing previous words from previous times in the sequence. Translating a word from speech audio to lexical data in this fashion may capture relationships between words that are potentially informative for speech recognition, e.g., recognizing a potentially ambiguous word based on a context of previous words, and/or recognizing a mispronounced word based on a context of previous words. Accordingly, speech recognition machine 130 may be able to robustly recognize speech, even when such speech may include ambiguities, mispronunciations, etc.

Speech recognition machine 130 may be trained with regard to an individual, a plurality of individuals, and/or a population. Training speech recognition machine 130 with regard to a population of individuals may cause speech recognition machine 130 to robustly recognize speech by members of the population, taking into account possible distinct characteristics of speech that may occur more frequently within the population (e.g., different languages of speech, speaking accents, vocabulary, and/or any other distinctive characteristics of speech that may vary between members of populations). Training speech recognition machine 130 with regard to an individual and/or with regard to a plurality of individuals may further tune recognition of speech to take into account further differences in speech characteristics of the individual and/or plurality of individuals. In some examples, different speech recognition machines (e.g., a speech recognition machine (A) and a speech recognition (B)) may be trained with regard to different populations of individuals, thereby causing each different speech recognition machine to robustly recognize speech by members of different populations, taking into account speech characteristics that may differ between the different populations.

Figure 9:
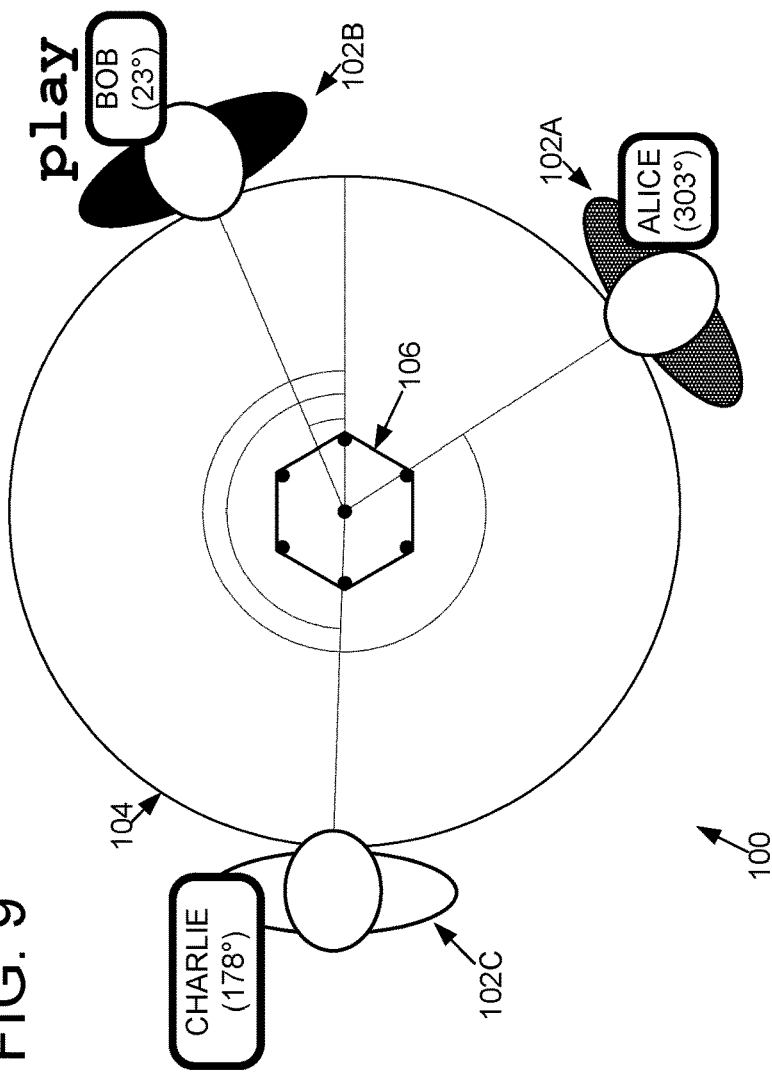
FIG. 9 shows an example of diarization by a computerized conference assistant.

Labeled and/or partially labelled audio segments may be used to not only determine which of a plurality of N speakers is responsible for an utterance, but also translate the utterance into a textural representation for downstream operations, such as transcription. FIG. 9 shows a nonlimiting example in which the computerized conference assistant 106 uses microphones 108 and camera 110 to determine that a particular stream of sounds is a speech utterance from Bob, who is sitting at 23° around the table 104 and saying: "Shall we play a game?" The identities and positions of Charlie and Alice are also resolved, so that speech utterances from those speakers may be similarly attributed and translated into text.

Figure 10:
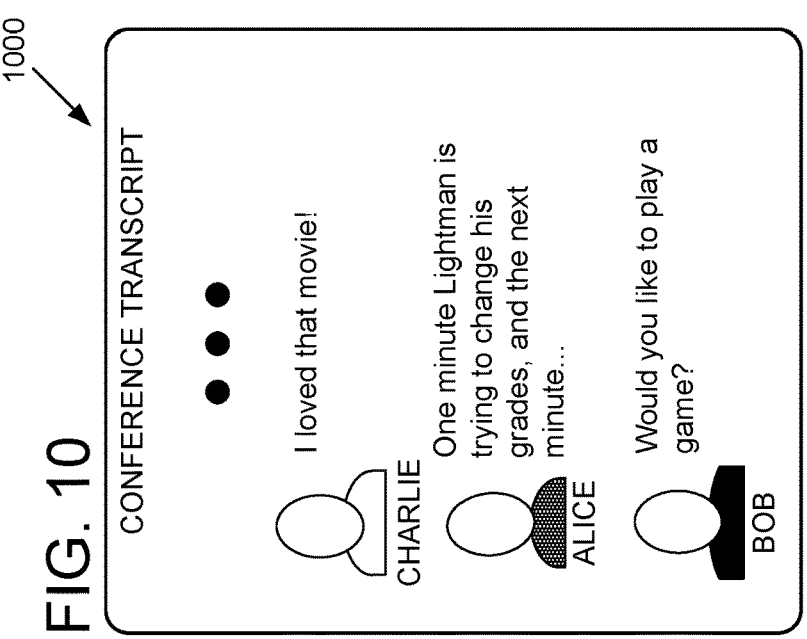
FIG. 10 shows an example conference transcript.

FIG. 10 shows an example conference transcript 1000, which includes text attributed, in chronological order, to the correct speakers. Transcriptions optionally may include other information, like the times of each speech utterance and/or the position of the speaker of each utterance. In scenarios in which speakers of different languages are participating in a conference, the text may be translated into a different language. For example, each reader of the transcript may be presented a version of the transcript with all text in that reader's preferred language, even if one or more of the speakers originally spoke in different languages. Transcripts generated according to this disclosure may be updated in real time, such that new text can be added to the transcript with the proper speaker attribution responsive to each new utterance.

Figure 11:
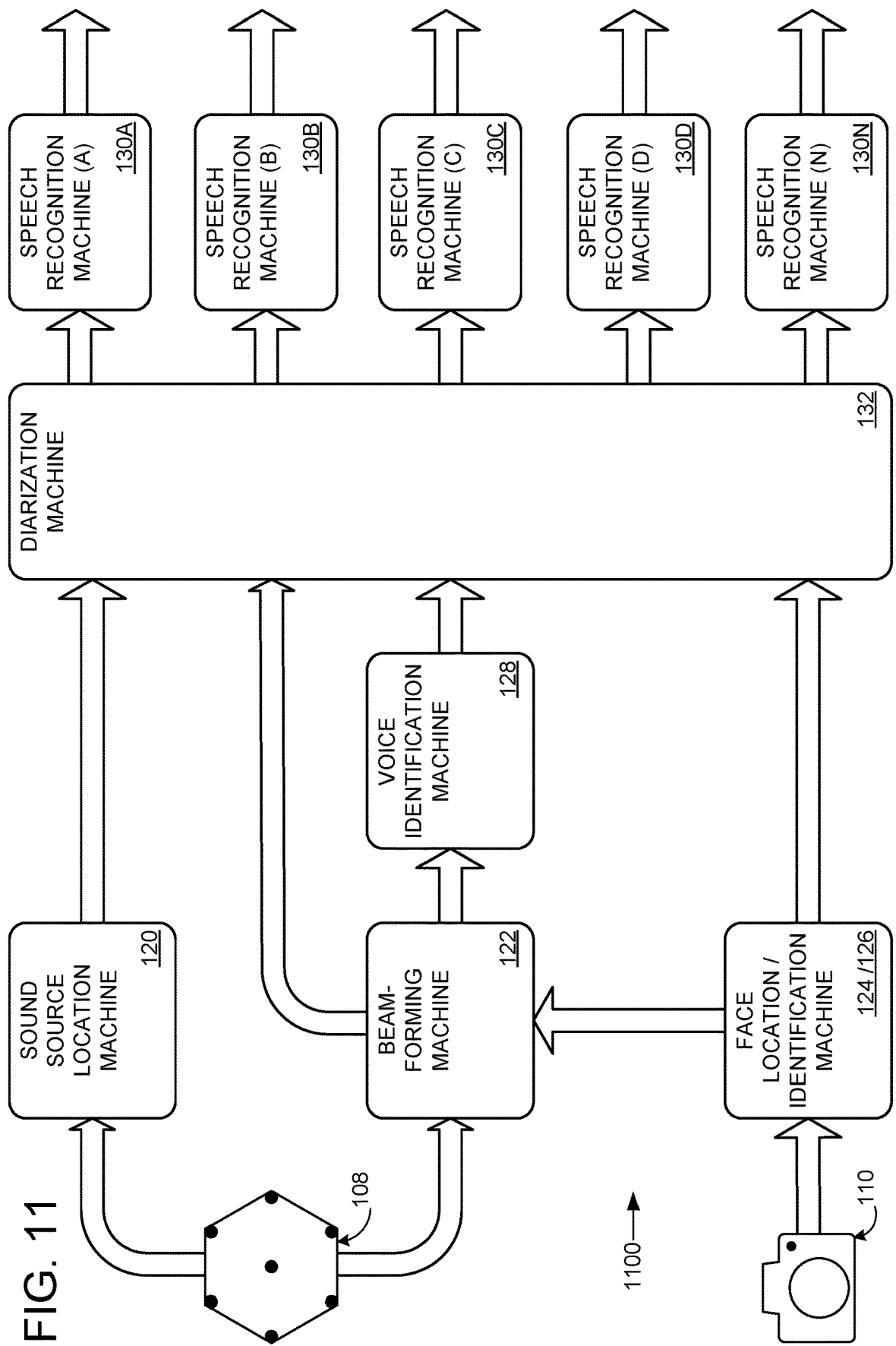
FIG. 11 schematically shows an exemplary diarization framework in which speech recognition machines are downstream from a diarization machine.

FIG. 11 shows a nonlimiting framework 1100 in which speech recognition machines 130a-n are downstream from diarization machine 132. Each speech recognition machine 130 optionally may be tuned for a particular individual speaker (e.g., Bob) or species of speakers (e.g., Chinese language speaker, or English speaker with Chinese accent). In some embodiments, a user profile may specify a speech recognition machine (or parameters thereof) suited for the particular user, and that speech recognition machine (or parameters) may be used when the user is identified (e.g., via face recognition). In this way, a speech recognition machine tuned with a specific grammar and/or acoustic model may be selected for a particular speaker. Furthermore, because the speech from each different speaker may be processed independent of the speech of all other speakers, the grammar and/or acoustic model of all speakers may be dynamically updated in parallel on the fly. In the embodiment illustrated in FIG. 11, each speech recognition machine may receive segments 604 and labels 608 for a corresponding speaker, and each speech recognition machine may be configured to output text 800 with labels 608 for downstream operations, such as transcription.

Figure 12:
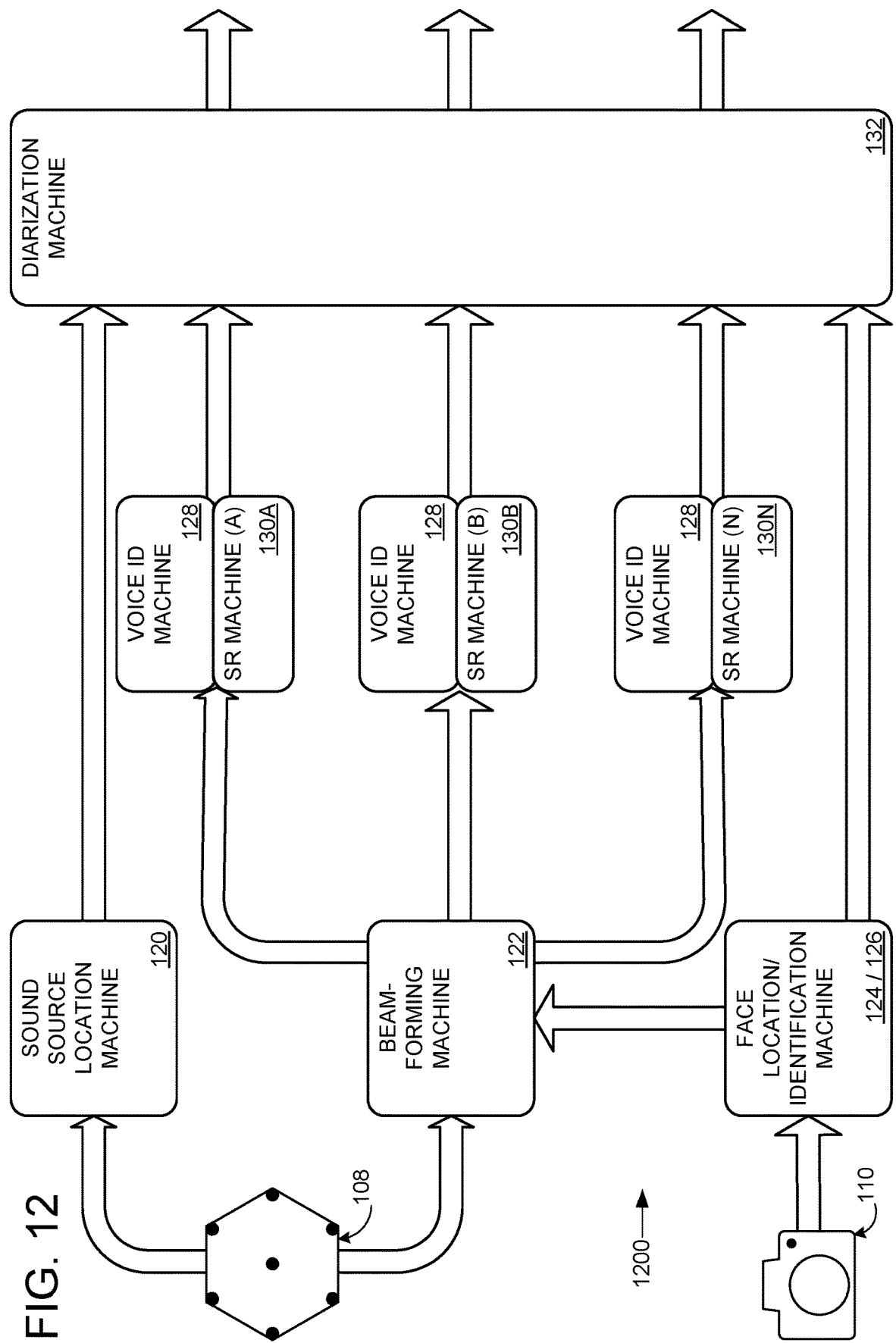
FIG. 12 schematically shows an exemplary diarization framework in which speech recognition machines are upstream from a diarization machine.

FIG. 12 shows a nonlimiting framework 1200 in which speech recognition machines 130*a-n* are upstream from diarization machine 132. In such a framework, diarization machine 132 may initially apply labels 608 to text 800 in addition to or instead of segments 604. Furthermore, the diarization machine may consider natural language attributes of text 800 as additional input signals when resolving which speaker is responsible for each utterance.

Figure 13:
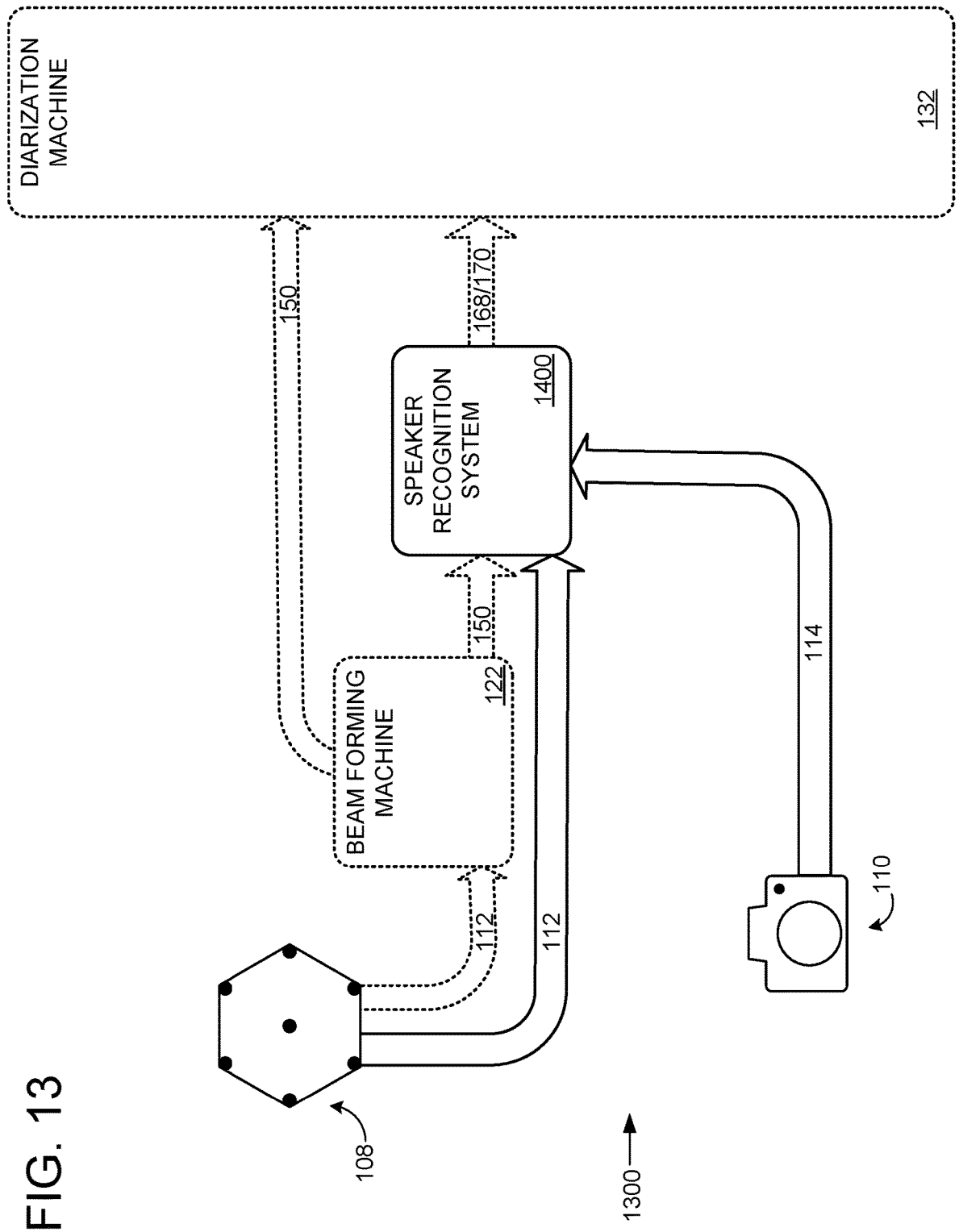
FIG. 13 schematically shows an exemplary speaker recognition system based on a joint neural network.

Face and/or voice recognition of speakers may be facilitated by a speaker recognition system configured to utilize audiovisual data including both face images and voice audio of the speaker. For example, FIG. 13 shows an alternative nonlimiting speaker recognition system 1400. Speaker recognition system 1400 is configured to receive computer-readable audio signals 112 from microphone 108 and digital video 114 from camera 110. Speaker recognition system 1400 is configured to recognize speakers based on joint audio and visual signals, e.g., based on computer-readable audio signals 112 and digital video 114, or based on any other suitable audiovisual signals. For example, speaker recognition system 1400 may optionally receive beamformed audio 150 from a beam forming machine 122 based on raw computer-readable audio signals 112. Accordingly, based on raw and/or preprocessed audiovisual data, speaker recognition system 1400 may recognize a speaker (e.g., recognize an identity 168 of a candidate face of a speaker and/or a voice ID 170 for the same speaker).

As shown in FIG. 13, speaker recognition system 1400 optionally may be incorporated into a framework 1300 (e.g., in order to supply face identity 168 and voice ID 170 for use in diarization by diarization machine 132). Framework 1300 is similar to diarization framework 600 as depicted in FIG. 6. However, in framework 1300, voice identification machine 128 and face identification machine 126 of FIG. 6 are replaced by the single speaker recognition system 1400. Accordingly, instead of recognizing a speaker separately with voice identification machine 128 and face identification machine 126 (e.g., as in framework 600 of FIG. 6), diarization framework 1300 is configured to supply computer readable audio signal 112 and/or beamformed audio 150, and digital video 114 to speaker recognition system 1400. Diarization framework 1300 may incorporate any other suitable components for diarization as described above, e.g., a sound source localization machine.

In some examples, locations of faces 166 detected by a face location machine (e.g., face location machine 124 as shown in FIG. 6) may be supplied to speaker recognition system 1400. Alternately or additionally, digital video 114 may be preprocessed based on detecting faces in a face detection machine, e.g., by cropping frames of video to focus on faces, by selecting frames of video in which faces are featured, or any other suitable preprocessing to emphasize the presence of faces in digital video 114.

Speaker recognition system 1400 may be trained on audiovisual data featuring a plurality of different individual speakers. Speaker recognition system 1400 may enroll one or more individual speakers and recognize such enrolled speakers, even when the enrolled speakers were not featured in the audiovisual data used for training. Speaker recognition system 1400 employs a joint neural network that may robustly identify speakers based on combined audio and video data. While speaker recognition system 1400 is illustrated in the context of a diarization framework 1300, this is not required. A speaker recognition system utilizing a joint neural network may be used independently or in any other suitable framework.

Figure 14:
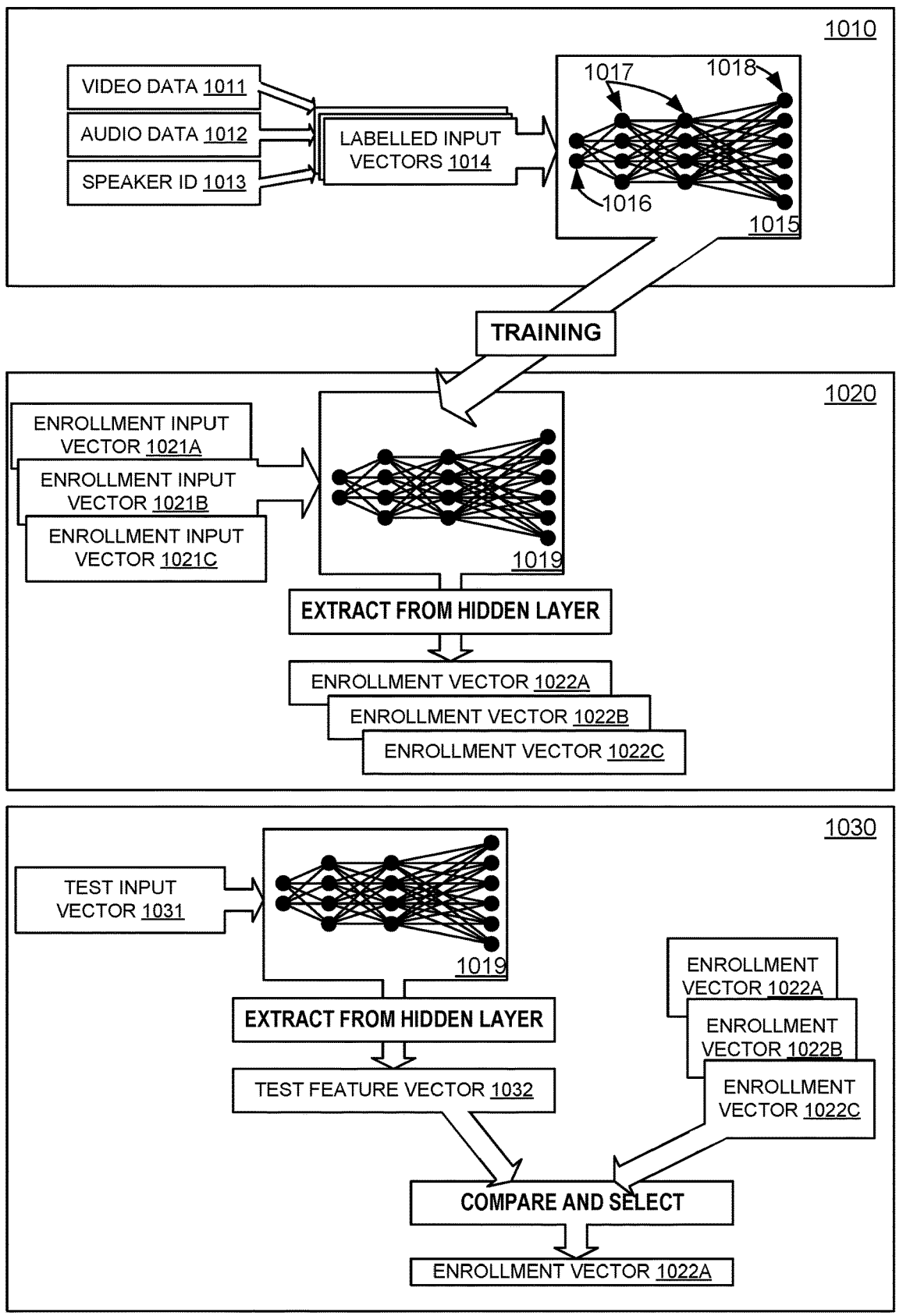
FIG. 14 depicts data flow and training architecture for an exemplary speaker recognition system based on a trained joint neural network.

FIG. 14 depicts data flow and training architecture for an exemplary speaker recognition system 1400 based on a trained joint neural network 1019 configured to identify a speaker based on audio and/or video of the speaker. The speaker recognition system may be used in any suitable manner by any computing system 2100 for any speaker recognition purpose, e.g., as part of diarization framework 1300 depicted in FIG. 13. In another nonlimiting example, a computerized intelligent assistant may utilize speaker recognition system 1400 for recognizing speakers while answering queries, performing assistive tasks requested by users, etc.

The speaker recognition system 1400 is configured to receive an input vector comprising both video features and audio features, and to predict identity of a speaker (e.g., a conference participant) based on the input vector. In some examples, the input vector is a concatenation of an audio feature vector and a video feature vector. Audio features in the input vector may be any suitable audio features, e.g., sample data representing raw audio in the form of mono, stereo, and/or multi-channel amplitude signals captured by one or more microphones (e.g., by a microphone array) and/or spectral data (e.g., based on transforming raw audio with Fourier transform, wavelet transform, or any other suitable representation of one or more frequency components of the raw audio data). As introduced above, such audio may be preprocessed via beamforming to isolate sounds. Video features in the input vector may be any suitable video features, e.g., raw video data captured by a camera, and/or pre-processed video data where such preprocessing may include any suitable transformation of raw video data (e.g., edge detection, image segmentation, denoising, frame interpolation, and/or spectral transformations).

Training and utilization of the speaker recognition system 1400 is broadly arranged into three phases: offline training phase 1010, online enrollment phase 1020, and online recognition phase 1030. In some examples, speaker recognition system 1400 may be implemented in one or more components enacting the three phases. For example, speaker recognition system 1400 may be implemented as a combination of a training machine configured to perform the offline training phase 1010, an enrollment machine configured to perform the online enrollment phase 1020, and a recognition machine configured to perform the online recognition phase 1030.

The speaker recognition system 1400 is configured to receive video data 1011, audio data 1012 and associated speaker identity data 1013. The speaker recognition system 1400 is configured to represent the received data as labelled input vectors 1014, each labelled input vector including video data, audio data, and a label indicating a particular designated speaker of a plurality of speakers who is featured in the video and/or audio. Performance of the speaker recognition system 1400 may be continually improved by training neural network 1015 based on a plurality of labelled input vectors 1014 (e.g., supervised training), wherein each labelled input vector includes audiovisual data featuring an exemplary human speaker. A human speaker indicated by each labelled vector may be anonymous (e.g., indicated by an anonymized, numeric identifier), but neural network 1015 may nonetheless be trained to distinguish between different exemplary human speakers. Neural network 1015 may be trained with regard to data representing any suitable number of exemplary human speakers, e.g., 10s, 100s, 1000s, or more.

Neural network 1015 includes an input layer 1016 configured to receive the input vectors 1014, one or more hidden layers 1017 configured to calculate any suitable function of the input vectors 1014 and other input layers (e.g., functions learned during training of neural network 1015), and an output layer 1018 configured to select a particular speaker from the plurality of speakers. Data flows through neural network 1015 from input layer 1016 through hidden layers 1017, resulting in outputs at output layer 1018. In general, each layer of neural network 1015 may include a plurality of nodes wherein each node in the layer outputs a value depending on one or more nodes in an upstream layer, e.g., a first hidden layer of neural network 1015 has nodes that each output a value depending on one or more nodes in the input layer.

In some examples, audio features and/or video features in the input vector may include raw audio data and/or raw video data. Alternately or additionally, audio features and/or video features in the input vector may include high-level audio and/or video output based on raw audio data and/or raw video data, by one or more preprocessing steps. For example, high-level audio and/or video features may include features output by an intermediate and/or output layer of a second machine learning model different than neural network 1015, e.g., embeddings of audio and/or video in a latent space learned by a second neural network. Accordingly, in addition to the neural network 1015, a speaker recognition system 1400 as described herein may incorporate any suitable neural network and/or machine learning techniques, e.g., for preprocessing raw audio data and/or raw video data to be included in the input vector.

Nodes of a downstream layer (e.g., depicted further to the right in FIG. 14) may depend on nodes of an upstream layer in any suitable fashion, for example, by outputting a non-linear transformation (e.g., hyperbolic tangent or rectified linear function) based on a weighted sum of outputs of nodes in the upstream layer. Filled circles in neural network 1015 represent nodes and lines between the filled circles represent data flowing from upstream to downstream, e.g., a node in a downstream layer may output a value dependent on values received from an upstream layer along lines connecting from the upstream layer to the downstream layer. For example, output layer 1018 may be configured to output, for each of a plurality of speaker identity output nodes, a confidence indicating a likelihood that a speaker corresponding to the speaker identity output node is the speaker who is featured in the received audio/video in a labelled input vector.

The output layer 1018 of neural network 1015 is configured to output confidence values representing an identity of a speaker selected from the plurality of speakers for whom audio/video data was supplied during training, and as such, confidences output at output layer 1018 may not be suitable for identifying other speakers (e.g., speakers not featured in any labelled input vector of the training data). Nevertheless, hidden layers of neural network 1015 are configured to output representations of speaker audio/video in a representation space learned by neural network 1015 that may encode high-level differences between different speakers (e.g., differences in voice, speech patterns, face appearance, facial expressions). Accordingly, outputs of hidden layers of neural network 1015 may be suitable for identifying speakers, even when such speakers were not featured in audio/video data (e.g., labelled input vectors) supplied during training.

Although input layer 1016, hidden layers 1017, and output layer 1018 are each depicted including a small plurality of nodes, neural network 1015 may include any suitable number of nodes (e.g., 10s, 100s, 1000s, or more nodes) in each of input layer 1016, hidden layers 1017, and output layer 1018. Similarly, although neural network 1015 is depicted with just two hidden layers, neural network 1015 may include any suitable number of hidden layers.

Neural network 1015 may be implemented using any suitable neural network techniques. For example, neural network 1015 may include a multi-layer neural network (e.g., a feed forward network and/or a deep neural network), a convolutional network (e.g., a spatial convolutional network configured to detect salient features of images and/or video frames, and/or a temporal convolutional network configured to detect salient features and/or patterns of sequence data, such as sequential audio and/or video data), a recurrent neural network (e.g., long short-term memory), and/or any other suitable combination of state-of-the-art and/or future neural network techniques.

Training neural network 1015 in the offline training phase 1010 may be through any suitable means, e.g., gradient-based optimization methods such as gradient descent. Gradients may be computed and/or estimated based on the backpropagation for neural networks, e.g., to compute a gradient of neural network 1015 with regard to input data and with regard to an objective function. The objective function may be based on any suitable analysis of inputs and/or outputs of neural network 1015, e.g., measuring accuracy, precision, and/or recall of predicted speaker identity indicated by confidence values assessed for different speaker identities, with regard to a label of an input vector indicating actual speaker identity. Offline training phase 1010 is configured to result in a trained joint neural network 1019 configured to identify speakers based on audio/video data. It is believed that training neural network 1015 jointly with regard to both audio and video may improve a quality of a representation space learned by neural network 1015, resulting in a high-quality trained joint neural network 1019 that may be used to robustly identify speakers.

Online enrollment phase 1020 includes receiving, at an input layer of trained joint neural network 1019, an enrollment input vector 1021A including audio and/or video data of a speaker to be enrolled for recognition by the speaker recognition system 1400. In some examples, speaker recognition system 1400 may be configured to start online enrollment phase 1020 responsive to a command, e.g., a command to enroll a new user or a command to enroll a plurality of different users. For example, speaker recognition system 1400 may enroll a new user as part of a user account creation process of a software application; accordingly, the software application may be configured to send a command to speaker recognition system 1400 to start online enrollment phase 1020. In other examples, on-the-fly enrollment may be performed as an unidentified individual is sound and video recorded, and then is subsequently identified via any suitable method. Online enrollment phase 1020 further includes extracting an enrollment profile vector 1022A output by a bottleneck hidden layer of trained joint neural network 1019, wherein the enrollment profile vector 1022A comprises an internal representation, in joint neural network 1019, of the speaker to be enrolled based on processing the enrollment input vector 1021A in hidden layers of trained joint neural network 1019.

In an example, the bottleneck hidden layer may be a most downstream (e.g., last) hidden layer of trained joint neural network 1019, immediately connected to the output layer of trained joint neural network 1019, so that outputs of the bottleneck hidden layer are supplied to the output layer of trained joint neural network 1019. Alternately or additionally, the bottleneck hidden layer may be any other hidden layer. In some examples, the bottleneck hidden layer may have a smaller number of neural network units (i.e., nodes) than an output layer of joint neural network 1019. In some examples, the bottleneck hidden layer may have a larger number of neural network units (i.e., nodes) than the output layer, or an equal number of neural network units to the output layer. As such, while the output layer of joint neural network 1019 may have one neural network unit for each speaker identified in the training dataset, the bottleneck hidden layer may have a smaller cardinality than the number of speakers in the training dataset. Accordingly, the bottleneck hidden layer may represent aspects of speech by a plurality of different speakers (e.g., features of voice and/or speaking style) in a compressed form, wherein a single neural network unit of the bottleneck hidden layer may represent a speech feature that may be consistent with one or more different speakers. Alternately or additionally, the bottleneck hidden layer may have an equal or greater number of neural network units as compared to the output layer of joint neural network 1019.

Based on training of neural network 1015 to produce joint neural network 1019, hidden layers of joint neural network 1019 are configured to output representations of speaker audio/video that may encode salient features of the audio/video data and may be useable to recognize salient differences between different speakers. Accordingly, online enrollment phase 1020 enrolls a new speaker by representing the enrollment input vector 1021A (containing audio/video data featuring the new speaker) as enrollment profile vector 1022A output by hidden layers of joint neural network 1019 based on the audio and/or video data of the new speaker received at an input layer of joint neural network 1019. The enrollment profile vector 1022A represents the speaker for subsequent identification.

Online enrollment phase 1020 may further include extracting further enrollment profile vectors (e.g., 1022B, 1022C) for recognizing further speakers based on further enrollment input vectors (e.g., 1021B, 1021C) each corresponding to a speaker. Each enrollment profile vector may be useable as a speaker profile for a particular speaker, based on salient features encoded in representations output by the bottleneck hidden layer.

In online recognition phase 1030, a speaker to be identified may be recognized based on a test input vector 1031 including audio and/or video input features. Recognizing the speaker includes processing test input vector 1031 with trained joint neural network 1019 in order to obtain a test feature vector 1032 representing the speaker to be identified, e.g., extracting test feature vector 1032 from a bottleneck hidden layer of trained joint neural network 1019, wherein the test feature vector 1032 comprises an internal representation, in joint neural network 1019, of the speaker to be identified based on processing the test input vector 1031 in hidden layers of trained joint neural network 1019. Recognizing the speaker further includes comparing test feature vector 1032 to one or more enrollment profile vectors obtained for speakers during enrollment phase 1020. Such comparison may be based on any suitable techniques for comparing vectors, e.g., inner product and/or cosine similarity, and/or nearest neighbor methods (e.g., approximate k-nearest neighbor methods).

An enrollment profile vector (e.g., enrollment profile vector 1022A) and test feature vector 1032 for a particular speaker may be similar according to the comparison applied in online recognition phase 1030, e.g., based on trained joint neural network 1019 representing audio and/or video featuring the speaker in a learned representation space that encodes high-level differences between different speakers. Accordingly, comparing enrollment profile vectors and test feature vectors output by trained joint neural network 1019 may be used to robustly recognize a speaker as a previously-enrolled speaker (e.g., when a comparison between enrollment profile vector 1022A and test feature vector 1032 for the speaker indicates a high similarity between enrollment profile vector 1022A and test feature vector 1032). By comparing a test feature vector 1032 to a plurality of different enrollment profile vectors (e.g., enrollment profile vectors 1022A, 1022B, and 1022C), the speaker recognition system 1400 may be able to recognize and select a speaker out of a plurality of different enrolled speakers based on enrollment profile vectors representing a speaker profile for each of the different enrolled speakers. For example, comparing and selecting from the enrollment profile vectors 1022A, 1022B, and 1022C may include selecting an enrolled speaker having an enrollment profile vector 1022A having a relatively highest similarity to test feature vector 1032. In some examples, recognizing a speaker may include comparing enrollment profile vector 1022A to test feature vector 1032 and assessing a comparison confidence indicating a degree of similarity between the two vectors, and determining that the speaker is present if the assessed comparison confidence exceeds a predefined threshold comparison confidence.

While the joint neural network may operate on full audio signal and/or a full input image or frame of input video, in some implementations audio preprocessing, face detection and/or active speaker detection may be used as a preprocessing step to focus the part of the captured audio and/or video upon which the joint neural network operates.

The recognition machine may be configured to selectively supply audiovisual test data to the input layer responsive to first detecting human presence (e.g., via a lower level presence detector, such as a motion sensor, face location machine, and/or sound source location machine). Alternately or additionally, the recognition machine may be configured to supply audiovisual test data to the input layer irrespective of detecting human presence (e.g., continually supplying audiovisual test data in order to continually recognize speakers who may be present in the audiovisual data).

In some examples, audiovisual data in an input vector received at an input layer of the joint neural network may be focused based on the preprocessing. Non-limiting examples of focusing audiovisual data responsive to preprocessing include selecting one or more particular frames and/or frame portions of the video, selecting particular channels (e.g., color channels, IR channels) from the captured video, selecting a particular duration of captured audio, selecting particular channels (e.g., based on a position of one or more microphones in a microphone array), and/or selecting particular frequencies such as speech formant frequencies (e.g., by applying a low-pass, high-pass, and/or band-pass filter). Face/speaker detection pre-processing may be used in both the training and test phases. It is noted that the joint neural network provides the most advantages when used on an active speaker, as both the video and the audio signals are informative. For efficient operation, the joint neural network may be selectively used only after a pre-processing/detection step in which speaking is recognized. However, such selective application of the network is only optional, and the network may be continually applied to recognize speakers in substantial portions (e.g., all) of input audio and video in some applications. For example, the microphone and speaker may be continually operated to capture audiovisual data, and the joint neural network may be continually operated to recognize speakers featured in the captured audiovisual data.

Figure 15:
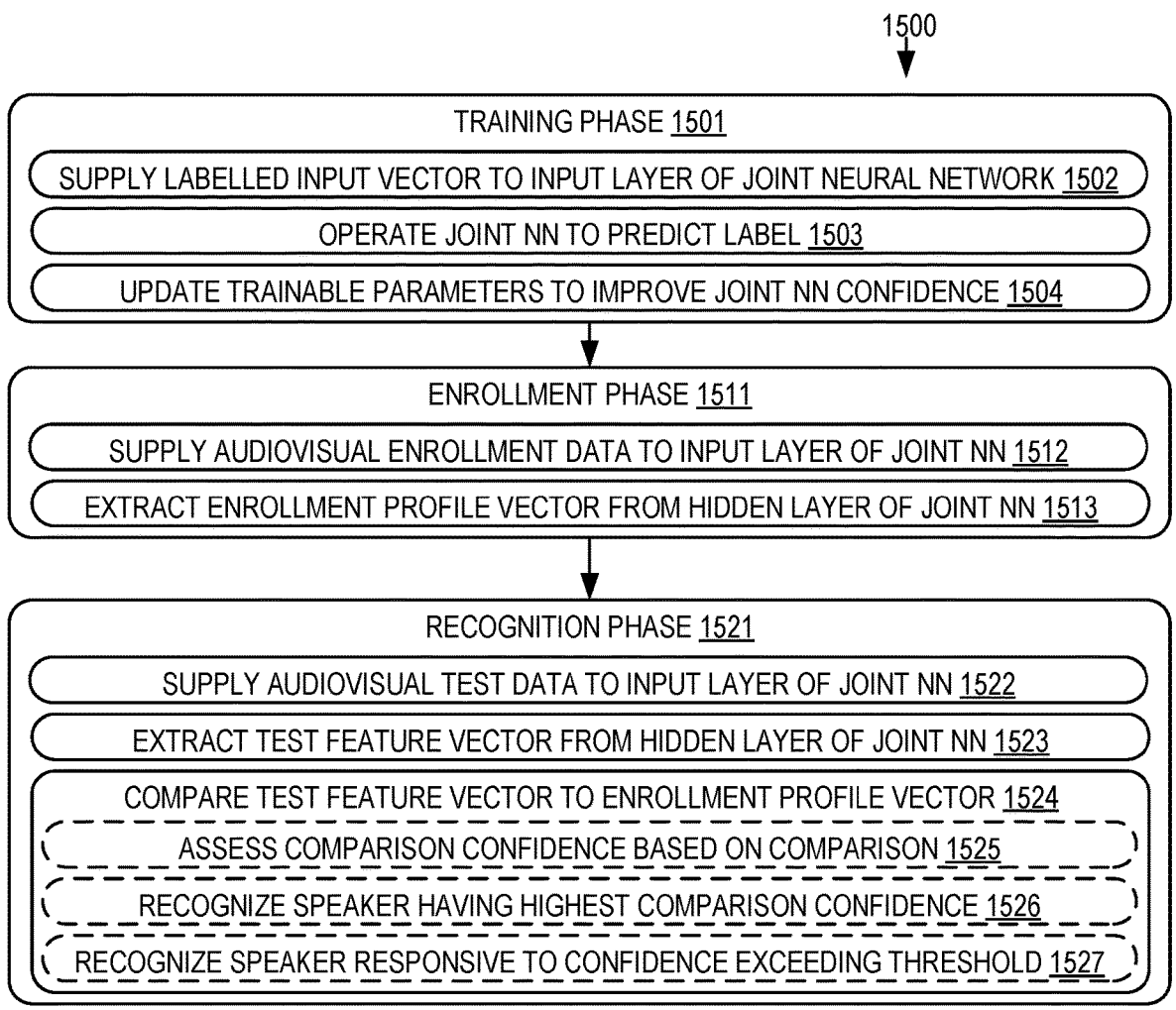
FIG. 15 shows a method for operating a speaker recognition system.

FIG. 15 shows an exemplary method 1500 for operating a speaker recognition system (e.g., speaker recognition system 1400). As in FIG. 14, the operation of the speaker recognition system is broadly arranged into three phases: training phase 1501, enrollment phase 1511, and recognition phase 1521. In training phase 1501, a joint neural network is trained based on a plurality of labelled input vectors (e.g., supervised training based on the plurality of labelled input vectors). Each labelled input vector includes audiovisual training data and a label identifying an exemplary speaker. The plurality of labelled input vectors may include any suitable number of examples for training, e.g., 10s, 100s, 1000s or more examples. At 1502, training phase 1501 includes supplying a labelled input vector to an input layer of a joint neural network (e.g., joint neural network 1015 of FIG. 14). At 1503, training phase 1501 includes operating the joint neural network to predict whether the audiovisual data corresponds to the exemplary human speaker featured in the audiovisual data. This prediction is based on the audiovisual data and not based on the label. In other words, if the joint neural network is trained with 1000 labelled input vectors corresponding to 1000 different exemplary human speakers, the joint neural network is operated to output a different confidence for each of the 1000 different human speakers. A relatively high confidence output at a particular output node is indicative of a successful prediction that a corresponding exemplary human speaker is featured in the corresponding labeled input vector. At this stage, the label is not considered. At 1504, training phase 1501 includes updating trainable parameters of the joint neural network to improve a confidence of the joint neural network in predicting whether the audiovisual data corresponds to the exemplary human speaker. At this stage, the label is considered in assessing whether a correct prediction was made. In some examples, updating the trainable parameters of the joint neural network is based on a gradient of an objective function measuring one or more of accuracy, precision, and recall of predicting the label based on the audiovisual data. Training phase 1501 may be performed with regard to each labelled input vector of the plurality of input vectors, so that the trainable parameters of the joint neural network may be updated with regard to each of the different exemplary speakers featured in the plurality of input vectors.

In enrollment phase 1511, one or more speakers may be enrolled for later recognition. Although the joint neural network may have been trained with regard to audiovisual data featuring a particular plurality of speakers (e.g., a training set of anonymized speakers), any speaker (e.g., a new speaker who was not featured in the training data) may be enrolled during enrollment phase 1511. At 1512, enrollment phase 1511 includes supplying audiovisual enrollment data to the input layer of the previously-trained joint neural network (e.g., previously trained joint neural network 1019, resulting from training joint neural network 1015 in training phase 1501). For example, the audiovisual enrollment data may comprise corresponding audio data and video data featuring a new speaker for enrollment. At 1513, enrollment phase 1511 includes extracting an enrollment profile vector from a hidden layer of the joint neural network, wherein such enrollment profile vector is output by a hidden layer of the previously-trained joint neural network based on the audiovisual enrollment data supplied to an input layer of the previously-trained joint neural network. The extracted enrollment profile vector represents the enrolled speaker and may be processed in recognition phase 1521 in order to recognize the enrolled speaker based on subsequently received audiovisual data.

In recognition phase 1521, a previously-enrolled speaker may be recognized. At 1522, recognition phase 1521 includes supplying audiovisual test data to the input layer of the previously-trained joint neural network (e.g., previously-trained joint neural network 1019). For example, the audiovisual data may include audio data and video data featuring the new speaker who was enrolled during enrollment phase 1511 to the input layer of the previously-trained joint neural network. At 1523, recognition phase 1521 includes extracting a test feature vector from the hidden layer of the joint neural network, wherein the test feature vector is output by the hidden layer based on the audiovisual test data. At 1524, recognition phase 1521 includes comparing the test feature vector to an enrollment profile vector for a previously-enrolled speaker. The previously-enrolled speaker may be recognized based on the comparison. For example, optionally, at 1525, method 1500 further includes assessing a comparison confidence based on the comparison between the test feature vector and the enrollment profile vector (e.g., where a high comparison confidence value indicates that the test feature vector and the enrollment profile vector are highly similar, and where a low comparison confidence indicates that the test feature vector and enrollment profile vector are dissimilar). Optionally, at 1526, method 1500 includes recognizing a speaker having a highest comparison confidence for a comparison of the test feature vector to an enrollment profile vector for each of a plurality of previously-enrolled speakers, and determining that the recognized speaker that yielded the highest confidence is present. Optionally, at 1527, method 1500 includes recognizing that a speaker is present responsive to the comparison confidence exceeding a predefined threshold.

The methods and processes described herein (e.g., speaker recognition according to method 1500) may be tied to a computing system of one or more computing devices. In particular, such methods and processes may be implemented as an executable computer-application program, a network-accessible computing service, an application-programming interface (API), a library, or a combination of the above and/or other compute resources.

Figure 16:
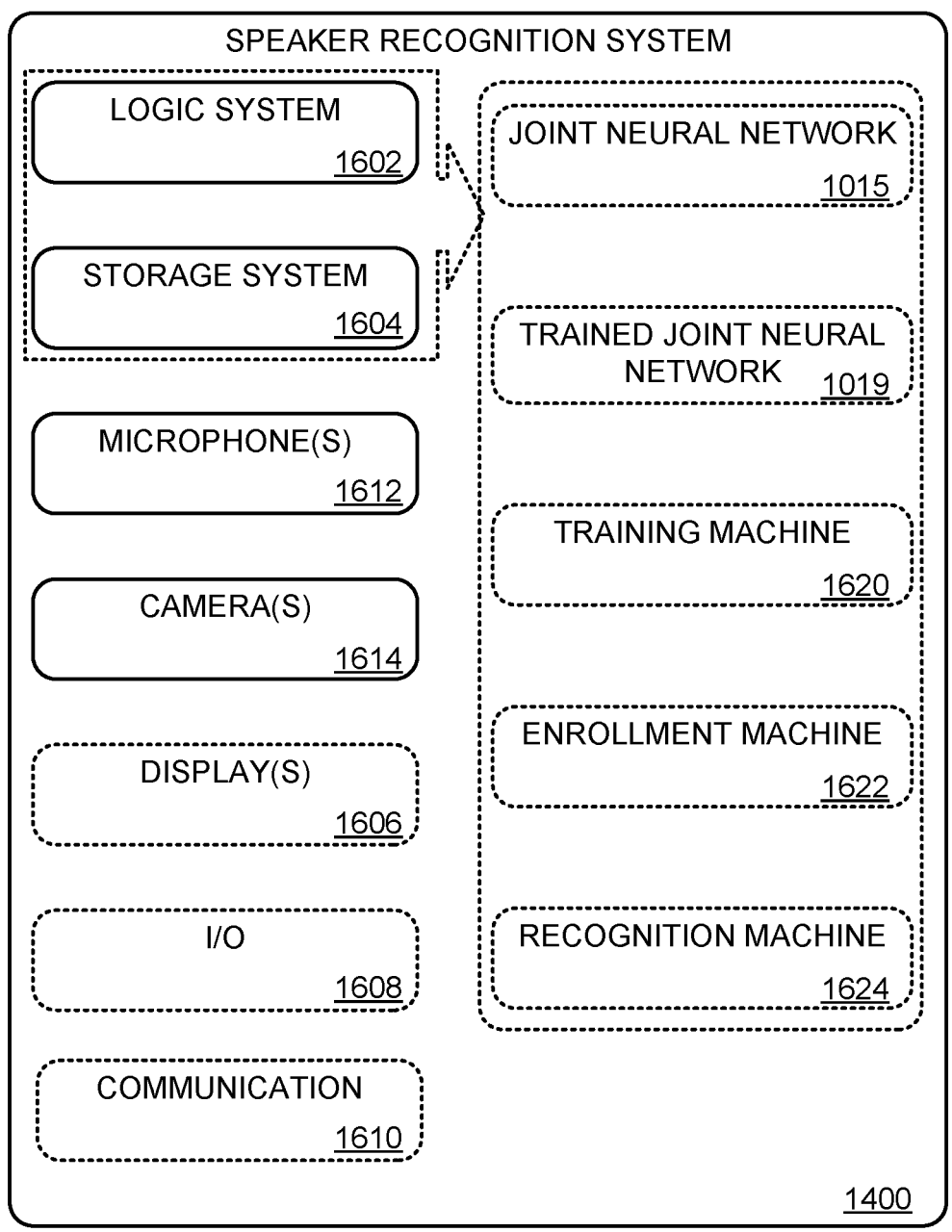
FIG. 16 shows an exemplary computing system.

FIG. 16 schematically shows a simplified representation of a computing system 1400 configured to provide any to all of the compute functionality described herein. Computing system 1400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1400 includes a logic subsystem 1602 and a storage subsystem 1604. Computing system 1400 further includes microphone(s) 1612 and camera(s) 1614. Computing system 1400 may optionally include a display subsystem 1606, input subsystem 1608, communication subsystem 1610, and/or other subsystems not shown in FIG. 16.

Logic subsystem 1602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1604 includes one or more physical devices configured to temporarily and/or permanently hold computer information such as data and instructions executable by the logic subsystem. When the storage subsystem includes two or more devices, the devices may be collocated and/or remotely located. Storage subsystem 1604 may include volatile, nonvolatile, dynamic, static, read/write, read-only, random-access, sequential-access, location-addressable, file-addressable, and/or content-addressable devices. Storage subsystem 1604 may include removable and/or built-in devices. When the logic subsystem executes instructions, the state of storage subsystem 1604 may be transformed—e.g., to hold different data.

Aspects of logic subsystem 1602 and storage subsystem 1604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines, for example, joint neural network 1015, trained joint neural network 1019, training machine 1620 configured to perform offline training phase 1010, enrollment machine 1622 configured to perform online enrollment phase 1020, and/or recognition machine 1624 configured to perform online recognition phase 1030. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines may be implemented via any suitable combination of state-of-the-art and/or future machine learning (ML), artificial intelligence (AI), and/or natural language processing (NLP) techniques, e.g., using any combination of ML, AI, and NLP techniques described above.

When included, display subsystem 1606 may be used to present a visual representation of data held by storage subsystem 1604. This visual representation may take the form of a graphical user interface (GUI). Display subsystem 1606 may include one or more display devices utilizing virtually any type of technology. In some implementations, display subsystem may include one or more virtual-, augmented-, or mixed reality displays.

When included, input subsystem 1608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1610 may be configured to communicatively couple computing system 1400 with one or more other computing devices. Communication subsystem 1610 may include wired and/or wireless communication devices compatible with one or more different communication protocols. The communication subsystem may be configured for communication via personal-, local- and/or wide-area networks.

In an example, a speaker recognition system comprises: a previously-trained joint neural network including an input layer configured to receive audiovisual data, and one or more hidden layers; a microphone configured to supply audio data to the input layer of the previously-trained joint neural network; a camera configured to supply video data to the input layer of the previously-trained joint neural network; an enrollment machine configured, during an enrollment phase, to: operate the microphone and the camera to supply audiovisual enrollment data featuring a newly enrolled speaker to the input layer of the previously-trained joint neural network; and extract an enrollment profile vector for the newly enrolled speaker, wherein the enrollment profile vector is extracted from a hidden layer of the previously-trained joint neural network based on the audiovisual enrollment data; and a recognition machine configured, during a recognition phase, to: operate the microphone and the camera to supply audiovisual test data featuring the newly enrolled speaker to the input layer of the previously-trained joint neural network; extract a test feature vector from the hidden layer of the previously-trained joint neural network based on the audiovisual test data; and compare the test feature vector to the enrollment profile vector extracted by the enrollment machine for the newly enrolled speaker. In this example or any other example, the recognition machine is configured to selectively supply audiovisual test data to the input layer responsive to detecting human presence. In this example or any other example, the recognition machine is configured to supply audiovisual test data to the input layer irrespective of previously detecting human presence. In this example or any other example, the enrollment profile vector is extracted from a bottleneck hidden layer of the joint neural network having a number of neural network units less than a number of neural network units in the output layer of the joint neural network. In this example or any other example, the enrollment profile vector is extracted from a bottleneck hidden layer of the joint neural network which is a most downstream hidden layer immediately connected to the output layer of the joint neural network. In this example or any other example, the recognition machine is further configured to: assess, for the test feature vector and for each candidate speaker of a plurality of different speakers, a comparison confidence based on a comparison of the test feature vector to an enrollment profile vector for the candidate speaker; and select a candidate speaker having a highest comparison confidence as the candidate speaker featured in the audiovisual test data. In this example or any other example, the recognition machine is further configured to: assess, for the test feature vector, a comparison confidence based on the comparison of the test feature vector to the enrollment profile vector for the newly enrolled speaker; and determine that the newly enrolled speaker is featured in the audiovisual test data responsive to the assessed comparison confidence exceeding a predefined threshold comparison confidence.

In an example, a method for speaker recognition comprises: during an enrollment phase: supplying audiovisual enrollment data, including audio data featuring a newly enrolled speaker and video data featuring the newly enrolled speaker, to an input layer of a previously-trained joint neural network; and extracting an enrollment profile vector for the newly enrolled speaker from a hidden layer of the previously-trained joint neural network based on the audiovisual enrollment data supplied to an input layer of the previously-trained joint neural network; and during a recognition phase: supplying audiovisual test data including audio data featuring the newly enrolled speaker and video data featuring the newly enrolled speaker to the input layer of the previously-trained joint neural network; and extracting a test feature vector from the hidden layer of the previously-trained joint neural network based on the audiovisual test data; and comparing the test feature vector to an enrollment profile vector previously extracted for the newly enrolled speaker. In this example or any other example, the method further comprises, in the recognition phase, selectively supplying audiovisual test data to the input layer responsive to detecting human presence. In this example or any other example, the method further comprises, in the recognition phase, supplying audiovisual test data to the input layer irrespective of previously detecting human presence. In this example or any other example, the enrollment profile vector is extracted from a bottleneck hidden layer of the joint neural network having a number of neural network units less than a number of neural network units in the output layer of the neural network. In this example or any other example, the enrollment profile vector is extracted from a bottleneck hidden layer of the joint neural network which is a most downstream hidden layer immediately connected to the output layer of the joint neural network. In this example or any other example, the method further comprises, in the recognition phase: assessing, for the test feature vector and for each candidate speaker of a plurality of different speakers, a comparison confidence based on a comparison of the test feature vector to an enrollment profile vector for the candidate speaker; and select a candidate speaker having a highest comparison confidence as the candidate speaker featured in the audiovisual test data. In this example or any other example, the method further comprises, in the recognition phase: assessing, for the test feature vector, a comparison confidence based on the comparison of the test feature vector to the enrollment profile vector for the newly enrolled speaker; and determining that the newly enrolled speaker is featured in the audiovisual test data, responsive to the assessed comparison confidence exceeding a predefined threshold comparison confidence. In this example or any other example, the previously-trained joint neural network is a joint neural network trained, in a training phase, based on a plurality of labelled input vectors, wherein each labelled input vector includes audiovisual training data and a label identifying an exemplary human speaker. In this example or any other example, the method further comprises, in the training phase: supplying, to the input layer of a joint neural network, a labelled input vector of the plurality of labelled input vectors; operating the joint neural network to predict whether the audiovisual data corresponds to the exemplary human speaker, where the prediction is based on the audiovisual data and not based on the label; and updating trainable parameters of the joint neural network to improve a confidence of the joint neural network in predicting whether the audiovisual data corresponds to the exemplary human speaker. In this example or any other example, updating the trainable parameters of the joint neural network is based on a gradient of an objective function measuring one or more of accuracy, precision, and recall of predicting the label based on the audiovisual data. In this example or any other example, the newly enrolled speaker is not featured in any labelled input vector used for training the joint neural network.

In an example, a method for speaker recognition comprises: training a joint neural network to identify a speaker of a plurality of speakers based on a plurality of labelled input vectors, wherein: a labelled input vector includes an input vector comprising audio data and video data featuring a speaker of the plurality of speakers, and a speaker identifier indicating the speaker; and the joint neural network is configured to output, for an input vector and for each candidate speaker of the plurality of speakers, a confidence indicating a likelihood that a speaker featured in one or more of the audio data and the video data of the input vector is the candidate speaker; enrolling a newly enrolled speaker based on an enrollment input vector comprising audio data and video data, by operating the previously-trained joint neural network to receive the enrollment input vector, and extract an enrollment vector output by a hidden layer of the previously-trained joint neural network; and recognizing the newly enrolled speaker based on a test input vector comprising audio data and video data, by: operating the previously-trained joint neural network to receive the test input vector, and extract a test feature vector output by the hidden layer of the previously-trained joint neural network; and comparing the test feature vector to the enrollment vector. In this example or any other example, the newly enrolled speaker is not featured in any labelled input vector used for training the joint neural network.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A speaker recognition system, comprising:
a previously-trained joint neural network including an input layer configured to receive audiovisual data, and one or more hidden layers;
a microphone configured to supply audio data to the input layer of the previously-trained joint neural network;
a camera configured to supply video data to the input layer of the previously-trained joint neural network;
an enrollment machine configured, during an enrollment phase, to:
operate the microphone and the camera to supply audiovisual enrollment data featuring a newly enrolled speaker to the input layer of the previously-trained joint neural network; and
extract an enrollment profile vector for the newly enrolled speaker, wherein the enrollment profile vector is extracted from a hidden layer of the previously-trained joint neural network based on the audiovisual enrollment data; and
a recognition machine configured, during a recognition phase, to:
operate the microphone and the camera to supply audiovisual test data featuring the newly enrolled speaker to the input layer of the previously-trained joint neural network;
extract a test feature vector from the hidden layer of the previously-trained joint neural network based on the audiovisual test data; and
compare the test feature vector to the enrollment profile vector extracted by the enrollment machine for the newly enrolled speaker.

2. The speaker recognition system of claim 1, wherein the recognition machine is configured to selectively supply audiovisual test data to the input layer responsive to detecting human presence.

3. The speaker recognition system of claim 1, wherein the recognition machine is configured to supply audiovisual test data to the input layer irrespective of previously detecting human presence.

4. The speaker recognition system of claim 1, wherein the enrollment profile vector is extracted from a bottleneck hidden layer of the joint neural network having a number of neural network units less than a number of neural network units in the output layer of the joint neural network.

5. The speaker recognition system of claim 1, wherein the enrollment profile vector is extracted from a bottleneck hidden layer of the joint neural network which is a most downstream hidden layer immediately connected to the output layer of the joint neural network.

6. The speaker recognition system of claim 1, wherein the recognition machine is further configured to:
assess, for the test feature vector and for each candidate speaker of a plurality of different speakers, a comparison confidence based on a comparison of the test feature vector to an enrollment profile vector for the candidate speaker; and
select a candidate speaker having a highest comparison confidence as the candidate speaker featured in the audiovisual test data.

7. The speaker recognition system of claim 1, wherein the recognition machine is further configured to:
assess, for the test feature vector, a comparison confidence based on the comparison of the test feature vector to the enrollment profile vector for the newly enrolled speaker; and
determine that the newly enrolled speaker is featured in the audiovisual test data responsive to the assessed comparison confidence exceeding a predefined threshold comparison confidence.

8. A method for speaker recognition, the method comprising:
during an enrollment phase:
supplying audiovisual enrollment data, including audio data featuring a newly enrolled speaker and video data featuring the newly enrolled speaker, to an input layer of a previously-trained joint neural network; and
extracting an enrollment profile vector for the newly enrolled speaker from a hidden layer of the previously-trained joint neural network based on the audiovisual enrollment data supplied to an input layer of the previously-trained joint neural network; and
during a recognition phase:
supplying audiovisual test data including audio data featuring the newly enrolled speaker and video data featuring the newly enrolled speaker to the input layer of the previously-trained joint neural network; and
extracting a test feature vector from the hidden layer of the previously-trained joint neural network based on the audiovisual test data; and
comparing the test feature vector to an enrollment profile vector previously extracted for the newly enrolled speaker.

9. The method of claim 8, further comprising, in the recognition phase, selectively supplying audiovisual test data to the input layer responsive to detecting human presence.

10. The method of claim 8, further comprising, in the recognition phase, supplying audiovisual test data to the input layer irrespective of previously detecting human presence.

11. The method of claim 8, wherein the enrollment profile vector is extracted from a bottleneck hidden layer of the joint neural network having a number of neural network units less than a number of neural network units in the output layer of the neural network.

12. The method of claim 8, wherein the enrollment profile vector is extracted from a bottleneck hidden layer of the joint neural network which is a most downstream hidden layer immediately connected to the output layer of the joint neural network.

13. The method of claim 8, further comprising, in the recognition phase:
assessing, for the test feature vector and for each candidate speaker of a plurality of different speakers, a comparison confidence based on a comparison of the test feature vector to an enrollment profile vector for the candidate speaker; and
select a candidate speaker having a highest comparison confidence as the candidate speaker featured in the audiovisual test data.

14. The method of claim 8, further comprising, in the recognition phase:
assessing, for the test feature vector, a comparison confidence based on the comparison of the test feature vector to the enrollment profile vector for the newly enrolled speaker; and
determining that the newly enrolled speaker is featured in the audiovisual test data, responsive to the assessed comparison confidence exceeding a predefined threshold comparison confidence.

15. The method of claim 8, wherein the previously-trained joint neural network is a joint neural network trained, in a training phase, based on a plurality of labelled input vectors, wherein each labelled input vector includes audiovisual training data and a label identifying an exemplary human speaker.

16. The method of claim 15, further comprising, in the training phase:

supplying, to the input layer of a joint neural network, a labelled input vector of the plurality of labelled input vectors;

operating the joint neural network to predict whether the audiovisual data corresponds to the exemplary human speaker, where the prediction is based on the audiovisual data and not based on the label; and updating trainable parameters of the joint neural network to improve a confidence of the joint neural network in predicting whether the audiovisual data corresponds to the exemplary human speaker.

17. The method of claim 16, wherein updating the trainable parameters of the joint neural network is based on a gradient of an objective function measuring one or more of accuracy, precision, and recall of predicting the label based on the audiovisual data.

18. The method of claim 9, wherein the newly enrolled speaker is not featured in any labelled input vector used for training the joint neural network.

19. A method for speaker recognition, the method comprising:

training a joint neural network to identify a speaker of a plurality of speakers based on a plurality of labelled input vectors, wherein:

a labelled input vector includes an input vector comprising audio data and video data featuring a speaker of the plurality of speakers, and a speaker identifier indicating the speaker; and the joint neural network is configured to output, for an input vector and for each candidate speaker of the plurality of speakers, a confidence indicating a likelihood that a speaker featured in one or more of the audio data and the video data of the input vector is the candidate speaker;

enrolling a newly enrolled speaker based on an enrollment input vector comprising audio data and video data, by operating the previously-trained joint neural network to receive the enrollment input vector, and extract an enrollment vector output by a hidden layer of the previously-trained joint neural network; and recognizing the newly enrolled speaker based on a test input vector comprising audio data and video data, by:

operating the previously-trained joint neural network to receive the test input vector, and extract a test feature vector output by the hidden layer of the previously-trained joint neural network; and comparing the test feature vector to the enrollment vector.

20. The method of claim 19, wherein the newly enrolled speaker is not featured in any labelled input vector used for training the joint neural network.

\* \* \* \* \*